(12) United States Patent
Pacione et al.

(10) Patent No.: US 9,788,674 B2
(45) Date of Patent: Oct. 17, 2017

(54) COVERING MODULE

(76) Inventors: Joseph Rocco Pacione, Newmarket (CA); John Anthony Pacione, Newmarket (CA)

( * ) Notice: Subject to any disclaimer, the term of this patent is extended or adjusted under 35 U.S.C. 154(b) by 0 days.

(21) Appl. No.: 13/257,527

(22) PCT Filed: Mar. 16, 2010

(86) PCT No.: PCT/CA2010/000407
§ 371 (c)(1),
(2), (4) Date: Sep. 19, 2011

(87) PCT Pub. No.: WO2010/105362
PCT Pub. Date: Sep. 23, 2010

(65) Prior Publication Data
US 2012/0011795 A1    Jan. 19, 2012

Related U.S. Application Data

(60) Provisional application No. 61/161,009, filed on Mar. 17, 2009, provisional application No. 61/240,797, filed on Sep. 9, 2009, provisional application No. 61/301,854, filed on Feb. 5, 2010.

(51) Int. Cl.
| | | |
|---|---|---|
| A47G 27/02 | (2006.01) | |
| A47G 27/04 | (2006.01) | |
| E04F 15/02 | (2006.01) | |
| E04F 13/08 | (2006.01) | |
| F16B 5/07 | (2006.01) | |

(52) U.S. Cl.
CPC ..... *A47G 27/0293* (2013.01); *A47G 27/0437* (2013.01); *A47G 27/0468* (2013.01); *A47G 27/0475* (2013.01); *E04F 13/0882* (2013.01); *E04F 13/0887* (2013.01); *E04F 15/02* (2013.01); *E04F 15/02138* (2013.01); *F16B 5/07* (2013.01); *Y10T 428/24008* (2015.01)

(58) Field of Classification Search
CPC ............ A47G 27/0293; A47G 27/0437; A47G 27/0468; A47G 27/0475; E04F 13/0887; E04F 15/02138; E04F 13/0882; E04F 15/02
USPC .......... 52/311.2, 385–387, 391, 506.05, 571, 52/582.1, 698, 745.06, 746.1, 746.12, 52/747.1, 747.11, DIG. 13, 511; 428/45, 428/58, 60, 62, 88, 95, 100
See application file for complete search history.

(56) References Cited

U.S. PATENT DOCUMENTS

| | | | | |
|---|---|---|---|---|
| 3,866,267 | A * | 2/1975 | Poletti | A47G 27/025 16/8 |
| 4,489,115 | A * | 12/1984 | Layman | E01C 13/08 156/258 |
| 4,649,069 | A * | 3/1987 | Tone | A47G 27/0293 428/45 |

(Continued)

*Primary Examiner* — Brian Glessner
*Assistant Examiner* — Adam Barlow
(74) *Attorney, Agent, or Firm* — Norton Rose Fulbright Canada LLP; Christopher N. Hunter

(57) ABSTRACT

A covering module for installation on a subsurface and for attachment to additional modules to form a finished decorative surface is provided. The covering module comprises a decorative covering that is detachably or permanently attached to an anchor sheet. The covering module is configured so as to expose a joining region of the decorative covering and a joining region of the anchor sheet.

3 Claims, 38 Drawing Sheets

(56) References Cited

U.S. PATENT DOCUMENTS

| | | | | |
|---|---|---|---|---|
| 4,766,022 | A * | 8/1988 | Tone | A47G 27/0293 428/62 |
| 5,191,692 | A * | 3/1993 | Pacione | A47G 27/045 156/249 |
| 5,200,245 | A * | 4/1993 | Brodrick, Jr. | A44B 18/0069 24/304 |
| 5,691,027 | A * | 11/1997 | Eckhardt | A44B 18/0003 24/306 |
| 5,786,062 | A * | 7/1998 | Callahan, Jr. | A44B 18/0073 221/33 |
| 6,083,596 | A * | 7/2000 | Pacione | A47G 27/045 156/304.3 |
| 6,481,063 | B2 * | 11/2002 | Shepard | A44B 18/0049 24/30.5 R |
| 6,797,353 | B1 * | 9/2004 | Pacione | A47G 27/0293 428/100 |
| 7,048,818 | B2 * | 5/2006 | Krantz | A44B 18/0049 156/244.25 |
| 8,276,243 | B2 * | 10/2012 | Caveney | A44B 18/008 24/16 R |
| 2002/0114909 | A1 * | 8/2002 | Aiello | A44B 18/0073 428/40.1 |
| 2003/0029110 | A1 * | 2/2003 | Pacione | A47G 27/025 52/311.2 |
| 2009/0293236 | A1 * | 12/2009 | Caveney | A44B 18/008 24/16 R |

* cited by examiner

COVERING MODULE

FIELD OF TECHNOLOGY

The present disclosure relates to a covering module and more specifically to a covering module for installation on a subsurface and for attachment to additional modules to form a finished decorative surface.

BACKGROUND

It is common to attach a flexible decorative covering, such as vinyl, linoleum, carpets or more rigid decorative coverings to a rigid subsurface such as a floor, made of wood or concrete. It is often desirable, or even required, to fasten the decorative covering to the subsurface which it covers and a variety of attachment methods have been developed over the years.

Conventional methods of attaching decorative coverings are typically intended for the permanent installation of the decorative covering onto the subsurface. If a portion of the decorative covering becomes physically damaged or permanently stained, the replacement of a portion of the decorative covering, if at all possible, requires complex procedures and can be relatively expensive. Also, decorative coverings that are installed using conventional methods are typically not intended to be uninstalled and reused elsewhere. Thus, if a decorative covering that is still in good condition must be removed for any reason from a subsurface that is covered, often it can not easily be removed and reused at another location.

Covering modules may comprise a covering (e.g., carpet, tiles or vinyl) that is to be attached or installed on a substrate (e.g., floor, wall or concrete base). Frequently, such attachment is by way of an adhesive layer, either provided on the covering module itself (e.g., on a substrate-facing side), on the substrate (e.g., on a covering-receiving side) or on an intermediate layer between the covering module and the substrate. However, it may be difficult to properly align a covering module on a substrate since once the covering module is placed on the substrate, the adhesive layer typically holds fast to the covering module making it difficult or impossible to reposition or correct alignment of the covering module, or at least difficult or impossible to reposition the covering module without potentially damaging the covering module and/or the substrate.

Accordingly, there is a need for an improved covering module which addresses one or more of these problems.

SUMMARY

In some aspects, the present disclosure provides a covering module for installation on a subsurface and for attachment to additional modules to form a finished decorative surface, the covering module comprising: a decorative covering having a back face; and an anchor sheet having a top face, the back face of the decorative covering being detachably attached to the top face of the anchor sheet; a portion of the decorative covering extending beyond a periphery of the anchor sheet so as to expose a joining region of the back face of the decorative covering; a portion of the anchor sheet extending beyond a periphery of the decorative covering so as to expose a joining region of the top face of the anchor sheet; the joining region of the decorative covering and the joining region of the anchor sheet each comprising a complementary portion of a first joining system of a first type and a second joining system of a second type.

In some examples, the first joining system comprises a hook and loop joining system and the second joining system comprises an adhesive joining system.

In some examples, the adhesive joining system is disposed in an edge region of the decorative covering.

In some examples, the adhesive joining system comprises a pressure-sensitive adhesive disposed on the anchor sheet.

In some examples, the hook and loop joining system comprises hooks disposed on the top face of the anchor sheet and complementary loops disposed on the back face of the decorative covering.

In some examples, the adhesive joining system comprises a pressure-sensitive adhesive disposed between the top face of the anchor sheet and a complementary area that is free of loops on the back face of the decorative covering.

In some examples, the adhesive joining system is disposed in an edge region of the decorative covering.

In some examples, the pressure-sensitive adhesive comprises a strip extending along an edge of the decorative covering.

In some examples, the anchor sheet is injection molded.

In some examples, the anchor sheet has a thickness that is greater than 1 mm.

In some examples, the back face of the decorative covering is detachably attached to the top face of the anchor sheet by the first joining system and by the second joining system.

In some aspects, there is provided a flooring module for installation on a subsurface and for attachment to additional modules to form a finished flooring surface, the flooring module comprising: a floor covering having a back face; and an anchor sheet having a top face, the back face of the floor covering being detachably attached to the top face of the anchor sheet by a hook and loop joining system and an adhesive joining system; a portion of the floor covering extending beyond a periphery of the anchor sheet so as to expose a joining region of the back face of the floor covering; a portion of the anchor sheet extending beyond a periphery of the floor covering so as to expose a joining region of the top face of the anchor sheet; the joining region of the floor covering and the joining region of the anchor sheet each comprising a complementary portion of the hook and loop joining system and of the adhesive joining system.

In some examples, the hook and loop joining system comprises hooks disposed on the top face of the anchor sheet and complementary loops disposed on the back face of the floor covering.

In some examples, the adhesive joining system comprises a pressure-sensitive adhesive disposed between the top face of the anchor sheet and a complementary area that is free of loops on the back face of the floor covering.

In some examples, the adhesive joining system is disposed along an edge of the floor covering.

In some examples, the anchor sheet is injection molded.

In some aspects, there is provided an anchor sheet for use in conjunction with a decorative covering for installation on a subsurface, the anchor sheet comprising: a substrate comprising a top face having an anchoring region for detachable attachment to a first decorative covering and a joining region for detachable attachment to a second decorative covering; a plurality of hooks disposed in the anchoring and joining regions; and a pressure-sensitive adhesive disposed in the anchoring and joining regions.

In some examples, the anchor sheet has a thickness that is greater than 1 mm.

In some examples, the anchor sheet comprises a protective cover disposed on at least a portion of the joining region.

In some examples, the pressure-sensitive adhesive is disposed so as to receive an edge region of the second decorative covering.

In some aspects, there is provided a covering module for installation onto a surface and for detachable attachment to at least one adjacent additional module to form a finished decorative surface, the covering module comprising: a decorative covering having a back face; an anchor sheet having a covering-receiving face, the back face of the decorative covering being detachably attached to the covering-receiving face of the anchor sheet; the covering module including: a portion of the decorative covering extending beyond a periphery of the anchor sheet so as to expose a joining region of the back face of the decorative covering, the joining region of the decorative covering having a contact surface; and a portion of the anchor sheet extending beyond a periphery of the decorative covering so as to expose a joining region of the covering-receiving face of the anchor sheet, the joining region of the anchor sheet having an interrupted surface; the joining region of the decorative covering and the joining region of the anchor sheet defining a contact interface, the contact interface comprising an adhesive for forming an interrupted adhesive bond with the at least one adjacent additional module; and a non-interrupted area located in an edge region of the decorative covering for facilitating an adhesive bond at at least one portion of the contact interface, the interrupted surface having at least one region permitting location of the non-interrupted area.

In some aspects, there is provided a covering module for installation onto a surface and for detachable attachment to at least one adjacent additional module to form a finished decorative surface, the covering module comprising: a decorative covering having a back face; an anchor sheet having a covering-receiving face, the back face of the decorative covering being attached to the covering-receiving face of the anchor sheet; the covering module including at least one of: a portion of the decorative covering extending beyond a periphery of the anchor sheet so as to expose a joining region of the back face of the decorative covering; and a portion of the anchor sheet extending beyond a periphery of the decorative covering so as to expose a joining region of the covering-receiving face of the anchor sheet; the at least one joining region of the decorative covering and the joining region of the anchor sheet having a cooperative component of a contact interface for forming an interrupted adhesive bond with the at least one adjacent additional module.

In some examples, the covering module further comprises a non-interrupted area located in an edge region of the decorative covering for facilitating an adhesive bond at at least one portion of the contact interface.

In some examples, the non-interrupted area is integral with one of the anchor sheet and the decorative covering.

In some examples, the non-interrupted area is "L"-shaped.

In some examples, the non-interrupted area has a width in the range of about 0.1 mm to about 5 cm.

In some examples, the covering-receiving face of the anchor sheet comprises an interrupted surface for forming the contact interface and the back face of the decorative covering comprises a contact surface for forming the contact interface, the contact interface comprising an adhesive for forming the interrupted adhesive bond between the interrupted surface and the contact surface.

In some examples, the covering module comprises a non-interrupted area located in an edge region of the decorative covering for facilitating an adhesive bond at at least one portion of the contact interface, the interrupted surface having at least one region permitting location of the non-interrupted area.

In some examples, the interrupted surface comprises at least one protrusion covering a range of about 0.01% to about 50% of the joining region of the anchor sheet.

In some examples, the interrupted surface is a regularly interrupted surface.

In some examples, the interrupted surface comprises a plurality of protrusions having substantially same height.

In some examples, the plurality of protrusions comprises a plurality of protrusions suitable for a hook and loop joining system.

In some examples, the plurality of protrusions comprise a plurality of posts.

In some examples, the plurality of protrusions have a density in the range of about 50 to about 2000 protrusions per square inch.

In some examples, the adhesive is a pressure sensitive adhesive.

In some examples, the anchor sheet has a thickness that is greater than 1 mm.

In some examples, the anchor sheet is injection molded.

In some examples, the back face of the decorative covering is detachably attached to the covering-receiving face of the anchor sheet by interrupted adhesive bond.

In some examples, the anchor sheet is permanently attached to the decorative covering.

In some examples, the decorative covering is made from at least one material selected from the group comprising: vinyl, luxury vinyl, linoleum, carpet, parquet, tile, wood, and ceramic.

In some aspects, there is provided a covering module for installation onto a surface and for detachable attachment to at least one adjacent additional module to form a finished decorative surface, the covering module comprising: a decorative covering; an anchor sheet; wherein at least a portion of the decorative covering is integral with at least a corresponding portion of the anchor sheet; the covering module including at least one of: a portion of the decorative covering extending beyond a periphery of the anchor sheet so as to expose a joining region of a back face of the decorative covering; and a portion of the anchor sheet extending beyond a periphery of the decorative covering so as to expose a joining region of a covering-receiving face of the anchor sheet; the at least one joining region of the decorative covering and the joining region of the anchor sheet having a cooperative component of a contact interface for forming an interrupted adhesive bond with the at least one adjacent additional module.

In some aspects, there is provided an anchor sheet for use in conjunction with a decorative covering for installation on a surface, the anchor sheet comprising: a substrate comprising a covering-receiving face having an anchoring region for detachable attachment to a first decorative covering and a joining region for detachable attachment to a second decorative covering; and an interrupted surface disposed in the anchoring and joining regions; wherein the joining region of the anchor sheet has a cooperative component of a contact interface for forming an interrupted adhesive bond with the second decorative covering.

In some examples, the anchor sheet comprises a non-interrupted in the joining region for facilitating an adhesive bond at at least one portion of the contact interface.

In some examples, the non-interrupted area is integral with the anchor sheet.

In some examples, the non-interrupted area is "L"-shaped.

In some examples, the non-interrupted area has a width in the range of about 0.1 mm to about 5 cm.

In some examples, the joining region comprises an interrupted surface for forming the contact interface.

In some examples, the anchor sheet further comprises a non-interrupted area in the joining region for facilitating an adhesive bond at at least one portion of the contact interface, the interrupted surface having at least one region permitting location of the non-interrupted area.

In some examples, the interrupted surface comprises at least one protrusion covering a range of about 0.01% to about 50% of the joining region of the anchor sheet.

In some examples, the interrupted surface is a regularly interrupted surface.

In some examples, the interrupted surface comprises a plurality of protrusions having substantially same height.

In some examples, the plurality of protrusions comprises a plurality of protrusions suitable for a hook and loop joining system.

In some examples, the plurality of protrusions comprise a plurality of posts.

In some examples, the plurality of protrusions have a density in the range of about 50 to about 2000 protrusions per square inch.

In some examples, the anchor sheet has a thickness that is greater than 1 mm.

In some examples, the anchor sheet is injection molded.

In some aspects, there is provided a covering module for installation onto a surface and for detachable attachment to at least one adjacent additional module to form a finished decorative surface, the covering module comprising: a decorative covering having a back face; an anchor sheet having a covering-receiving face, the back face of the decorative covering being detachably attached to the covering-receiving face of the anchor sheet; the covering module including: a portion of the decorative covering extending beyond a periphery of the anchor sheet so as to expose a joining region of the back face of the decorative covering; and a portion of the anchor sheet extending beyond a periphery of the decorative covering so as to expose a joining region of the covering-receiving face of the anchor sheet; at least one of the joining region of the decorative covering and the joining region of the anchor sheet having a compartmentalized surface, wherein the compartmentalized surface defines at least one void for inhibiting the flow of a fluid containable therein; the joining region of the decorative covering and the joining region of the anchor sheet defining a contact interface, the contact interface comprising an adhesive for forming an adhesive bond with the at least one adjacent additional module.

In some examples, the covering module further comprises a non-compartmentalized area located in an edge region of the decorative covering for facilitating an adhesive bond at at least one portion of the contact interface.

In some examples, the non-interrupted area is integral with one of the anchor sheet and the decorative covering.

In some examples, the non-interrupted area is "L"-shaped.

In some examples, the non-interrupted area has a width in the range of about 0.1 mm to about 5 cm.

In some examples, the compartmentalized surface is provided at least on the joining region of the anchor sheet.

In some examples, the at least one void covers a range of about 0.01% to about 50% of the contact interface.

In some examples, the compartmentalized surface comprises a plurality of regularly distributed voids.

In some examples, the compartmentalized surface comprises a plurality of voids having substantially same depth.

In some examples, the compartmentalized surface comprises at least one aperture.

In some examples, the compartmentalized surface further comprises a plurality of protrusions suitable for a hook and loop joining system.

In some examples, the plurality of protrusions comprise a plurality of posts.

In some examples, the plurality of protrusions have a density in the range of about 50 to about 2000 protrusions per square inch.

In some examples, the adhesive is a pressure sensitive adhesive.

In some examples, the anchor sheet has a thickness that is greater than 1 mm.

In some examples, the anchor sheet is injection molded.

In some examples, the anchor sheet is permanently attached to the decorative covering.

In some examples, the decorative covering is made from at least one material selected from the group comprising: vinyl, luxury vinyl, linoleum, carpet, parquet, tile, wood, and ceramic.

In some aspects, there is provided a covering module for installation onto a surface and for detachable attachment to at least one adjacent additional module to form a finished decorative surface, the covering module comprising: a decorative covering; an anchor sheet; wherein at least a portion of the decorative covering is integral or permanently attached with at least a corresponding portion of the anchor sheet; the covering module including at least one of: a portion of the decorative covering extending beyond a periphery of the anchor sheet so as to expose a joining region of a back face of the decorative covering; and a portion of the anchor sheet extending beyond a periphery of the decorative covering so as to expose a joining region of a covering-receiving face of the anchor sheet; at least one of the joining region of the decorative covering and the joining region of the anchor sheet having a compartmentalized surface, wherein the compartmentalized surface defines at least one void for inhibiting the flow of a fluid containable therein; the at least one joining region of the decorative covering and the joining region of the anchor sheet having a cooperative component of a contact interface for forming an adhesive bond with the at least one adjacent additional module.

In some aspects, there is provided an anchor sheet for use in conjunction with a decorative covering for installation on a surface, the anchor sheet comprising: a substrate comprising a covering-receiving face having an anchoring region for detachable attachment to a first decorative covering and a joining region for detachable attachment to a second decorative covering; and a compartmentalized surface disposed at least in the joining region, wherein the compartmentalized surface defines at least one void for inhibiting the flow of a fluid containable therein; wherein the joining region of the anchor sheet has a cooperative component of a contact interface for forming an adhesive bond with the second decorative covering.

In some examples, the compartmentalized surface is further disposed in the anchoring region.

In some examples, the anchor sheet further comprises a non-compartmentalized in the joining region for facilitating an adhesive bond at at least one portion of the contact interface.

In some examples, the non-interrupted area is integral with the anchor sheet.

In some examples, the non-interrupted area is "L"-shaped.

In some examples, the non-interrupted area has a width in the range of about 0.1 mm to about 5 cm.

In some examples, the at least one void covers a range of about 0.01% to about 50% of the joining region of the anchor sheet.

In some examples, the compartmentalized surface comprises a plurality of voids having a regular distribution.

In some examples, the compartmentalized surface comprises a plurality of voids having substantially same depth.

In some examples, the compartmentalized surface comprises at least one aperture.

In some examples, the compartmentalized surface comprises a plurality of protrusions suitable for a hook and loop joining system.

In some examples, the plurality of protrusions comprise a plurality of posts.

In some examples, the plurality of protrusions have a density in the range of about 50 to about 2000 protrusions per square inch.

In some examples, the anchor sheet has a thickness that is greater than 1 mm.

In some examples, the anchor sheet is injection molded.

In some aspects, there is provided an anchor sheet for use in conjunction with a decorative covering for installation on a surface, the anchor sheet comprising: a substrate comprising a covering-receiving face having an anchoring region for detachable attachment to a first decorative covering and a joining region for detachable attachment to a second decorative covering; and a plurality of protrusions extending from a surface-engaging face opposite to the covering-receiving face for elevating the anchor sheet from the surface; wherein the joining region of the anchor sheet has a cooperative component of a contact interface for forming an adhesive bond with the second decorative covering.

In some examples, the anchor sheet further comprises a compartmentalized surface disposed at least on the joining region, wherein the compartmentalized surface defines at least one void for inhibiting the flow of a fluid containable therein.

In some examples, the plurality of protrusions is configured substantially symmetrically to the compartmentalized surface.

In some examples, the at least one void defines at least a portion of the plurality of protrusions.

In some examples, the plurality of protrusions covers about 0.01% to about 50% of the surface-engaging face.

In some examples, the plurality of protrusions is provided in a density of about 100 to about 500 protrusions per square inch.

In some aspects, there is provided a use of a temporary covering for attaching a decorative covering to a substrate, there being an adhesive layer for forming adhesive bond between the decorative covering and the substrate, the temporary covering having reduced receptiveness to the adhesive layer.

In some aspects, there is provided a method of attaching a decorative covering to a substrate using a temporary covering, the method comprising: providing a temporary covering between the decorative covering and the substrate; moving the decorative covering into a desired position; and removing the temporary covering, thereby allowing formation of an adhesive bond between the decorative covering and the substrate; wherein the temporary covering has reduced receptiveness to formation of the adhesive bond.

Other and further advantages and features of the present disclosure will be apparent to those skilled in the art from the following detailed description of example embodiments thereof, taken in conjunction with the accompanying drawings.

BRIEF DESCRIPTION OF THE FIGURES

The present disclosure will be further understood from the following detailed description of example embodiments of the present disclosure, with reference to the drawings in which.

DETAILED DESCRIPTION

Similar references are used in different figures to denote similar components.

The presently disclosed covering module may be used for installation on a surface to be covered such as a floor or a wall, for example, and for detachable attachment to additional modules to form a finished decorative surface. As used in the present disclosure, the term "surface" may refer to finished or unfinished surfaces to be covered, including wood, concrete, tiled, carpeted, or covered surfaces, and may also refer to subsurfaces. In a flooring application, the covering module could be a flooring module that could be installed so that it is free-floating on the surface to be covered so that it can be uninstalled and reused elsewhere. The covering module could also be designed to be fixed to the surface at one or more discrete points, for example when the surface is a wall.

In various example embodiments, the covering module includes a decorative covering and an anchor sheet. The decorative covering and the anchor sheet may be detachably attached, may be permanently or non-detachably attached or may be integral with each other. The covering module includes at least one joining region for detachable or permanent (i.e., non-detachable) attachment to at least one adjacent module.

Example variants of the covering module are now described

Example 1

Figure 1:
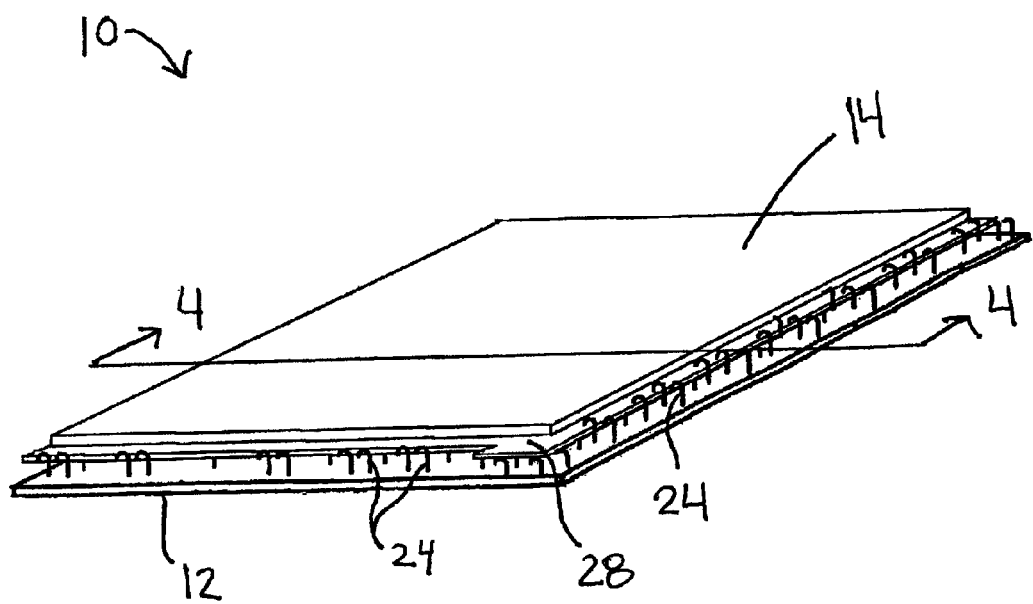
FIG. 1 illustrates in an isometric view, a covering module in accordance with an example embodiment of the present disclosure.

FIG. 1 illustrates an example embodiment of the covering module, generally shown at 10, in accordance with an example embodiment of the present disclosure. The covering module 10 may include a decorative covering 14 and an anchor sheet 12. The decorative covering 14 and the anchor sheet 12 may be detachably attached together by, for example, a first joining system of a first type and a second joining system of a second type.

Figure 2:
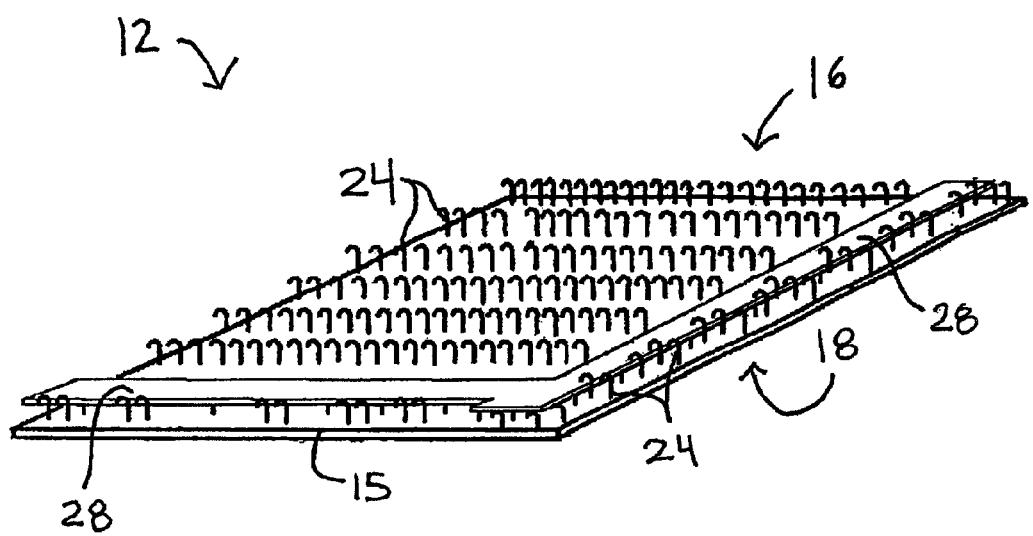
FIG. 2 illustrates in an isometric view, an anchor sheet of the covering module of FIG. 1.
Figure 3:
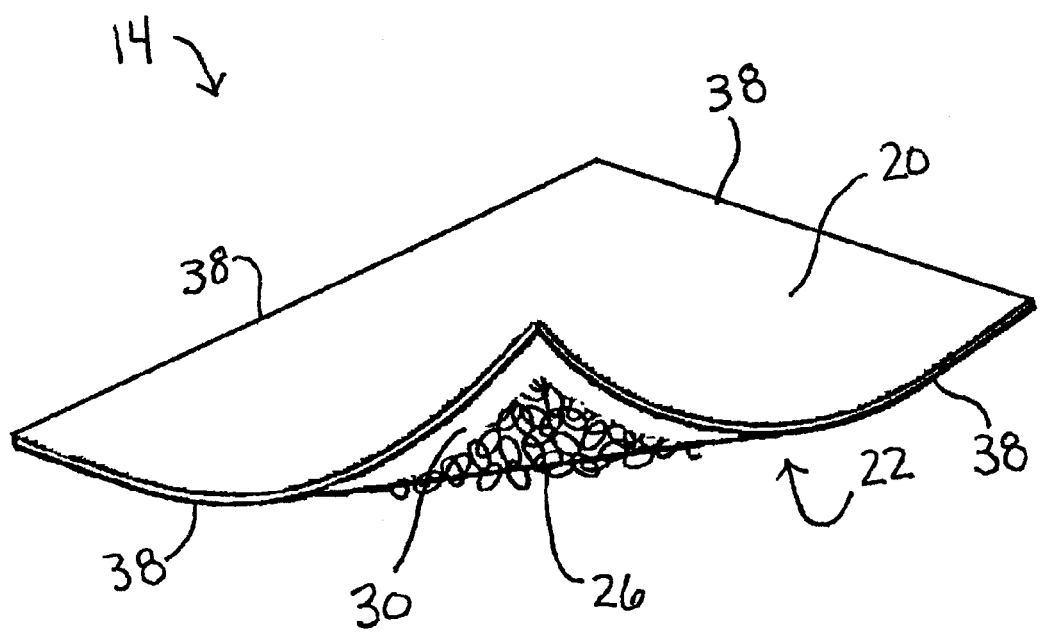
FIG. 3 illustrates in an isometric view, a decorative covering of the covering module of FIG. 1.

FIGS. 2 and 3 illustrate details of the construction of the anchor sheet 12 and of decorative covering 14 respectively. The anchor sheet 12 may include a substrate 15, a top face, generally shown at 16 and a bottom face, generally shown at 18. The decorative covering 14 may include a front or decorative face 20 and an opposite back face, generally shown at 22. The back face 22 of the decorative covering 14 and the top face 16 of the anchor sheet 12 may each comprise a complementary portion of the first joining system and of the second joining system.

According to the exemplary embodiment shown in the figures, the first joining system may comprise a hook and loop joining system and the second joining system may include an adhesive joining system. The hook and loop joining system may comprise hooks 24 disposed on the top face 16 of the anchor sheet 12 and complementary loops 26 disposed on the back face 22 of the decorative covering 14. The adhesive joining system may have properties allowing it to be released and reused, and may comprise a pressure-sensitive adhesive 28 disposed between the top face 16 anchor sheet 12 and a complementary area 30 that is optionally free of loops 26 disposed on the back face 22 of the decorative covering 14.

Figure 4A:
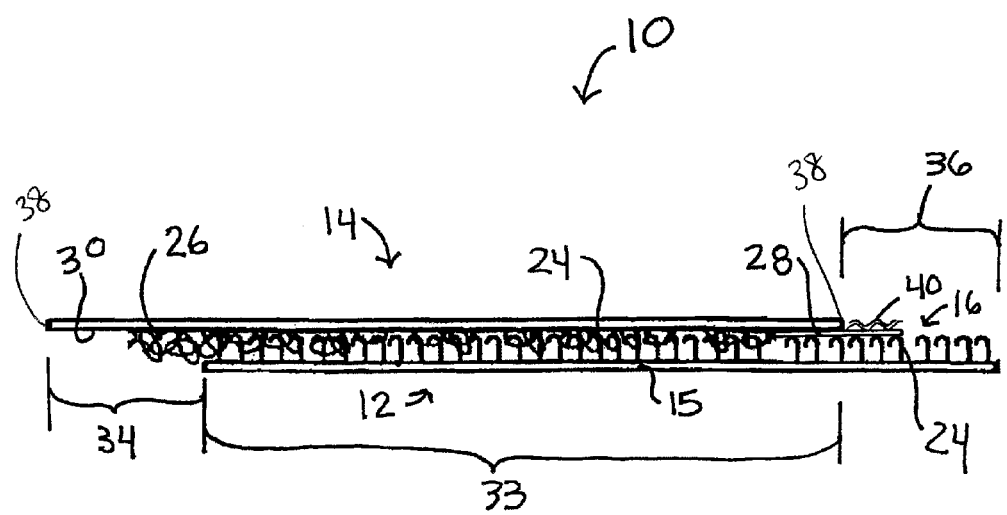
FIG. 4A illustrates a cross-sectional view of the covering module of FIG. 1 along line 4-4 of FIG. 1 in accordance with an example embodiment of the present disclosure.
Figure 4B:
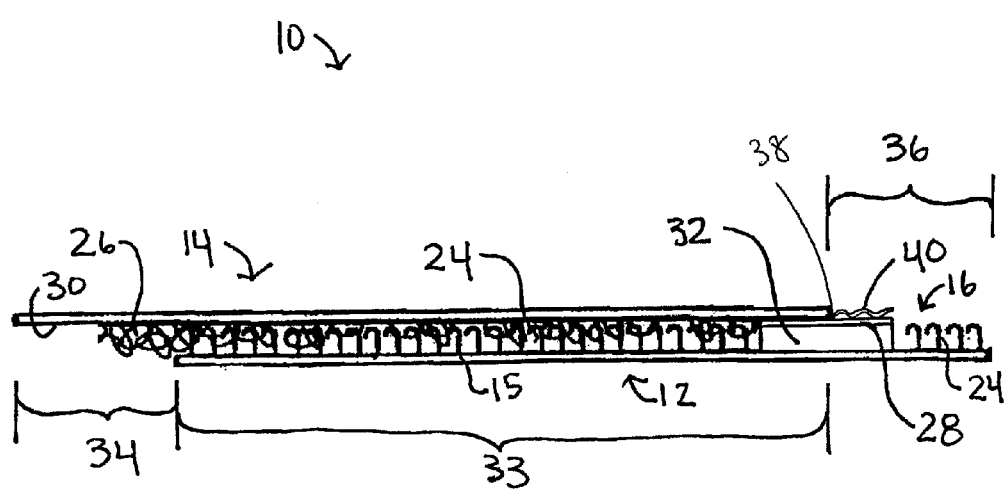
FIG. 4B illustrates a cross-sectional view of the covering module of FIG. 1 along line 4-4 of FIG. 1 in accordance with an example embodiment of the present disclosure.

FIGS. 4A and 4B each illustrate a cross-section of the covering module 10 along line 4-4 of FIG. 1 according to an exemplary embodiment. As shown in FIG. 4A, the pressure-sensitive adhesive 28 may be disposed directly on top of the hooks 24 of the anchor sheet 12. Alternatively, as shown in FIG. 4B, the pressure-sensitive adhesive 28 may be disposed on an area of the top face 16 of the anchor sheet 12 which is free of hooks 24. Depending on the height and configuration of the hooks 24, and, of the thickness of the pressure-sensitive adhesive 28, a spacer 32 may be required to position the pressure-sensitive adhesive 28 relative to the back face 22 of the decorative covering 14 so that the pressure-sensitive adhesive 28 may make contact with the back face 22 of the decorative covering 14 and reduce any unevenness in the decorative face 20 of the decorative covering 14 when the decorative covering 14 and the anchor sheet 12 are attached together. The spacer 32 may be integrally formed with the anchor sheet 12 or may be a separate piece attached to the anchor sheet 12. Alternatively, the pressure-sensitive adhesive 28 may be selected to have a suitable thickness so that the use of the spacer 32 is not required. The top face 16 of the anchor sheet 12 may comprise an anchoring region 33 for detachable attachment to a first covering module 10.

Figure 5:
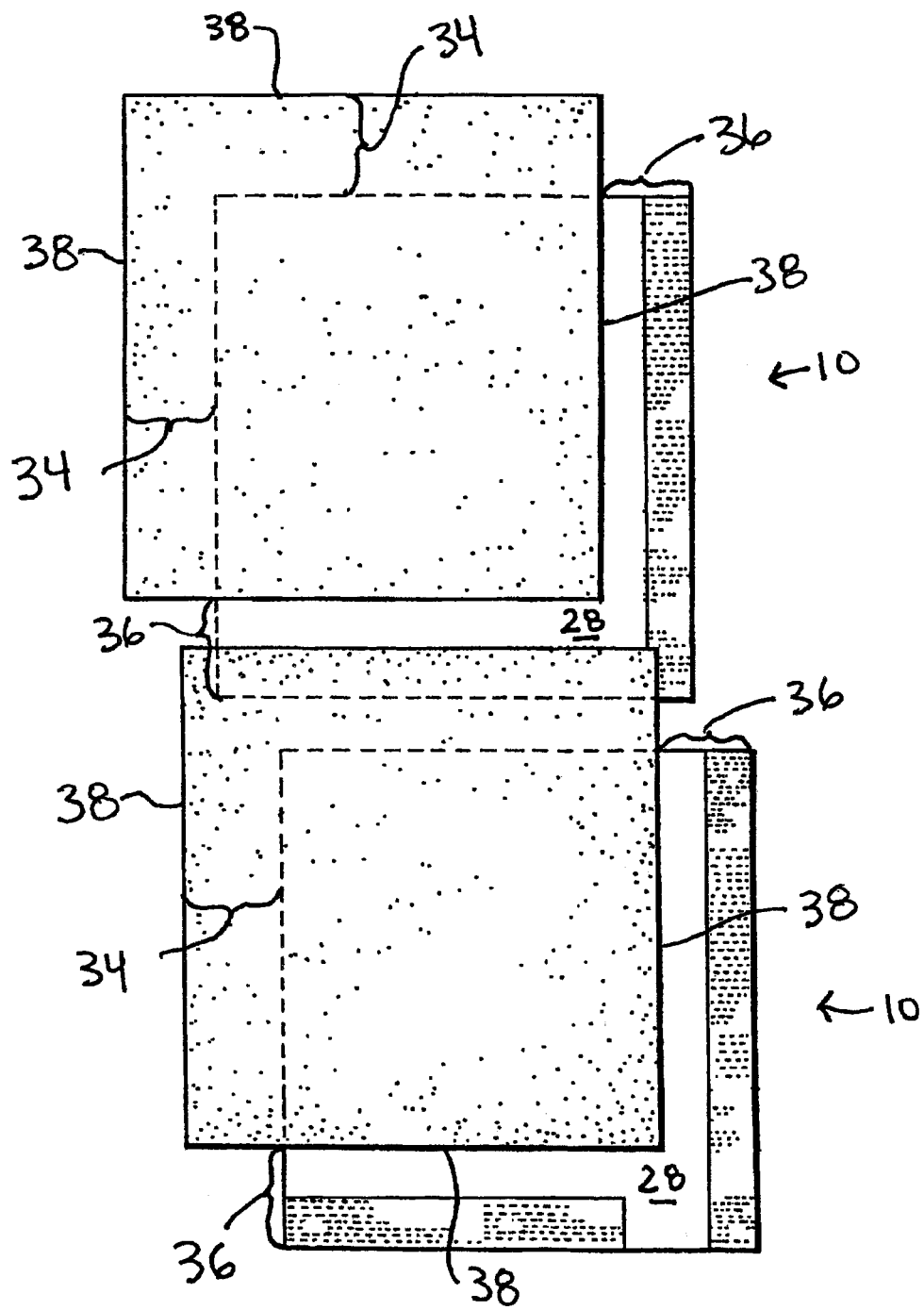
FIG. 5 illustrates in a top plan view, the installation of two covering modules of FIG. 1.
Figure 6:
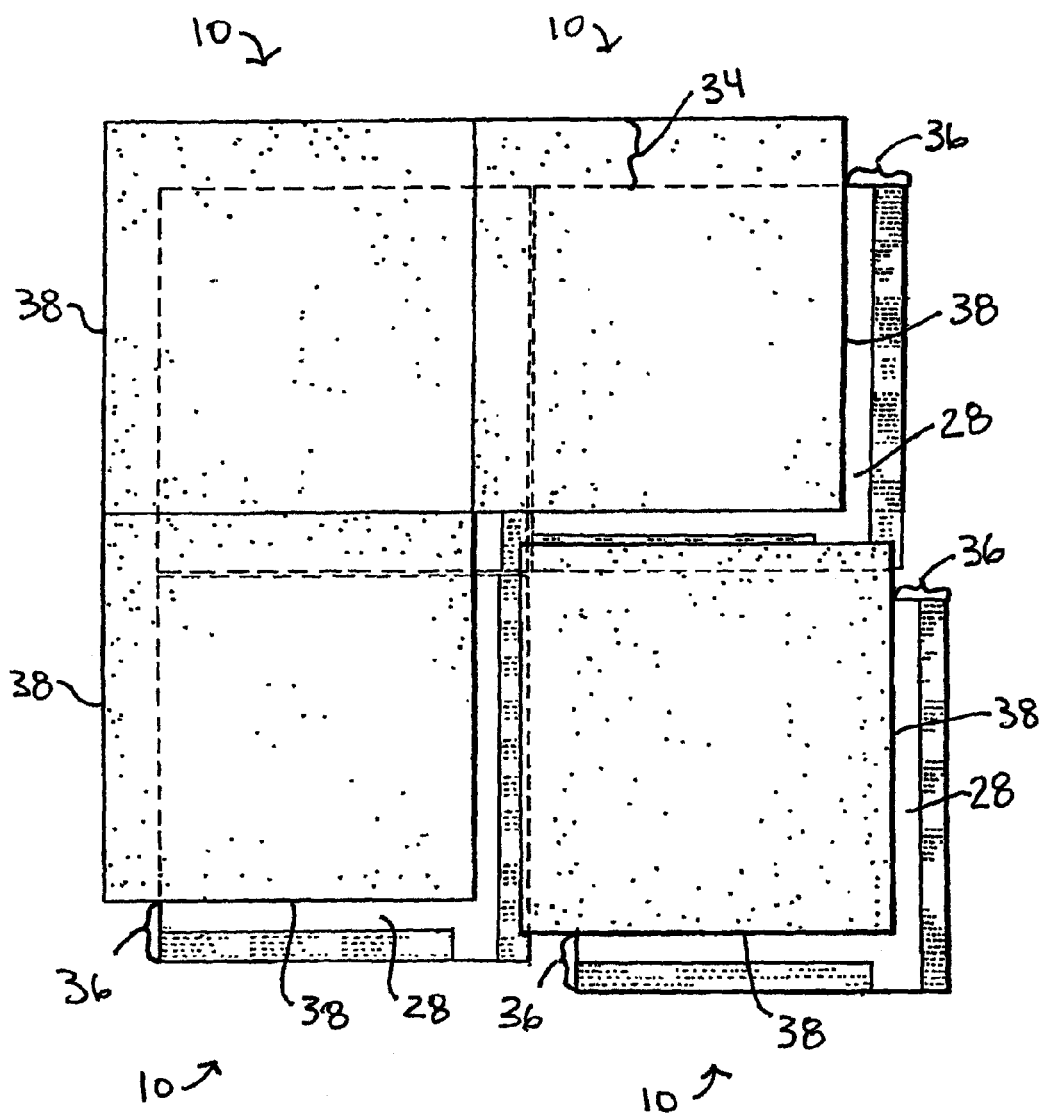
FIG. 6 illustrates in a top plan view, an example installation of multiple covering modules of FIG. 1 on a subsurface to be covered.

FIGS. 5 and 6 illustrate how a plurality a covering modules 10 may be detachably attached together in order to form a finished decorative surface when installed over a larger subsurface (not shown). In order to facilitate the attachment of the covering module 10 to neighboring covering modules 10, the decorative covering 14 and the anchor sheet 12 are configured and positioned relative to each other so that a portion of the decorative covering 14 extends beyond a periphery of the anchor sheet 12 so as to expose a joining region 34 of the back face 22 of the decorative covering 14. Similarly, a portion of the anchor sheet 12 may extend beyond a periphery of the decorative covering 14 so as to expose a joining region 36 of the top face 16 of the anchor sheet 12. The joining regions 34 and 36 may each comprise a complementary portion of the first joining system and of the second joining system. For example, the joining region 34 of the decorative covering 14 may comprise both loops 26 and the area 30 that is free of loops 26, and, the joining region 36 of the anchor sheet 12 may comprise both the pressure-sensitive adhesive 28 and hooks 24. During installation, the attachment of multiple covering modules 10 together is done by overlapping the joining regions 34 and 36 of each covering module 10 with the complementary joining regions 34 and 36 of its neighboring covering modules 10 as shown in FIGS. 5 and 6. The complementary portions of the first and second joining systems that are disposed on the joining regions 34 and 36 serve to detachably attach neighboring covering modules 10 together.

The hooks 24 on the anchor sheet 12 may be integrally formed with the substrate 15 or they may be otherwise attached to the anchor sheet 12. Accordingly, they may be molded together as one piece with the substrate 15. The hooks 24 may be provided in any suitable shape, size and configuration that will work with the complementary loops 26 on the back face 22 of the decorative covering 14. For example, the hooks 24 may have also a mushroom shape (not shown) in order to simplify the tooling required for injection molding the substrate 15 together with the hooks 24. The hook density on the top face 16 of the anchor sheet 12 may be selected to provide a suitable bond strength between the anchor sheet 12 and the decorative covering 14. The hook density may also be selected based on a necessary peel force required to detach the decorative covering 14 from the anchor sheet 12.

The pressure-sensitive adhesive 28 may be provided in any suitable form known in the art. For example, it may be applied to the top face 16 of the anchor sheet 12, or, alternatively, it could be provided on the back face 22 of the decorative covering 14. In another embodiment, the pressure-sensitive adhesive 28 could comprise two complementary components where a first component is applied to the decorative covering 14 and a second component is applied to the anchor sheet 12. For example, the pressure-sensitive adhesive 28 may be provided in the form of a suitable double-sided adhesive tape or may be an adhesive that is applied in liquid form. In any case, the pressure-sensitive adhesive 28 should be selected so that it provides a sufficient bond and shear strength between the decorative covering 14 and the anchor sheet 12. Advantageously, the pressure-sensitive adhesive 28 could also be selected so that it is reusable a number of times and that the decorative covering 14 can be detached from the anchor sheet 12 and replaced with a new decorative covering 14 even several years after the initial installation. The pressure-sensitive adhesive 28 may also be selected to have a good resistance to moisture.

The use of joining systems of different types between the decorative covering 14 and the anchor sheet 12 may provide several advantages. Firstly, the use of an adhesive joining system in combination with the hook-and-loop joining system may provide a hybrid solution where the ease of detachment of the decorative covering 14 from the anchor sheet 12 provided by the hook-and-loop joining system is maintained while any lateral movement, which may be inherent to a hook-and-loop joining system, between the decorative covering 14 and the anchor sheet 12 is reduced or eliminated through the use of the pressure-sensitive adhesive 28. Also, the pressure-sensitive adhesive 28 may be disposed in regions near or at edges 38 of the decorative covering 14 in the form of a strip of a certain width. At this location, the pressure-sensitive adhesive 28 may reduce the likelihood of mold forming under the decorative covering 14 by inhibiting moisture from seeping under the decorative covering 14 in the event of a spill for example. The pressure-sensitive adhesive 28 can also reduce or eliminate the occurrence or curling of the corners of the decorative covering 14. In a flooring application, this may allow the covering module 10 to sustain heavier loads and also have an increased resistance to rolling loads. The pressure-sensitive adhesive 28 may also be disposed in an intermittent manner such as in a few discrete locations.

Another advantage provided by the two types of joining systems between the decorative covering 14 and the anchor sheet 12 is that the decorative covering 14 can easily be removed and replaced with a new decorative covering 14 for reasons such as if it becomes damaged. Once installed, the decorative covering 14 may be removed independently from the anchor sheet 12 and replaced, or an entire covering module 10 may be removed altogether if it needs to be moved and installed at a different location. This provides the option of uninstalling a covering module 10 without damaging it and reusing it at a different location if desired. Depending on the type of pressure-sensitive adhesive 28 that is used, the covering module 10, or only the decorative covering 14, may be uninstalled without the use of tools. Alternatively, in other cases, it may be necessary to apply heat to the area in question in order to loosen the pressure-sensitive adhesive during removal or to re-activate its adhesive properties during installation. Care should be taken so as to reduce contamination of the pressure-sensitive adhesive 28 from dust or other materials during installation. Advantageously, a replacement decorative covering 14 could be provided with a replacement pressure-sensitive adhesive 28. Alternatively, a replacement decorative covering 14 could comprise only pressure-sensitive adhesive 28 or only loops 26 on its back face 22. In a further embodiment, hooks 24 could be provided on the back face 22 of the decorative covering 14 and loops 26 could be provided on the top face 16 of the anchor sheet 12.

Example 2

Figure 7:
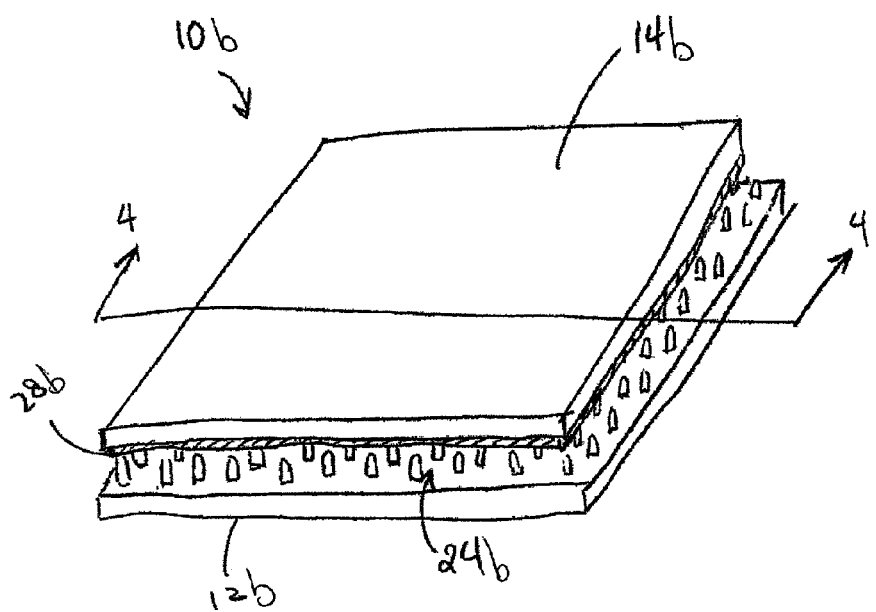
FIG. 7 illustrates in an isometric view, a covering module in accordance with an example embodiment of the present disclosure.

FIG. 7 illustrates another example embodiment of the covering module, generally shown at 10b, in accordance with an example embodiment of the present disclosure. The covering module 10b includes a decorative covering 14b and an anchor sheet 12b. The decorative covering 14b and the anchor sheet 12b are detachably or permanently attached, or integral to each other, and the covering module 10b includes at least one joining region (described below) for attachment to at least one adjacent module. The joining region has a cooperative component of a contact interface for forming an interrupted adhesive bond with the adjacent module. In some example embodiments, the covering module 10b has joining regions having complementary components of the contact interface, as will be described below.

By "interrupted adhesive bond" is meant that the adhesive bond is not uniform and continuous over the contact interface, but rather has portions having the adhesive bond interrupted by portions without any adhesive bond. In some example embodiments, the interrupted adhesive bond is a regularly interrupted adhesive bond, meaning that the portions with the adhesive bond and the portions without any adhesive bond are found in a regular or repeating pattern. In some instances the bond may be formed in an irregular pattern.

Figure 8:
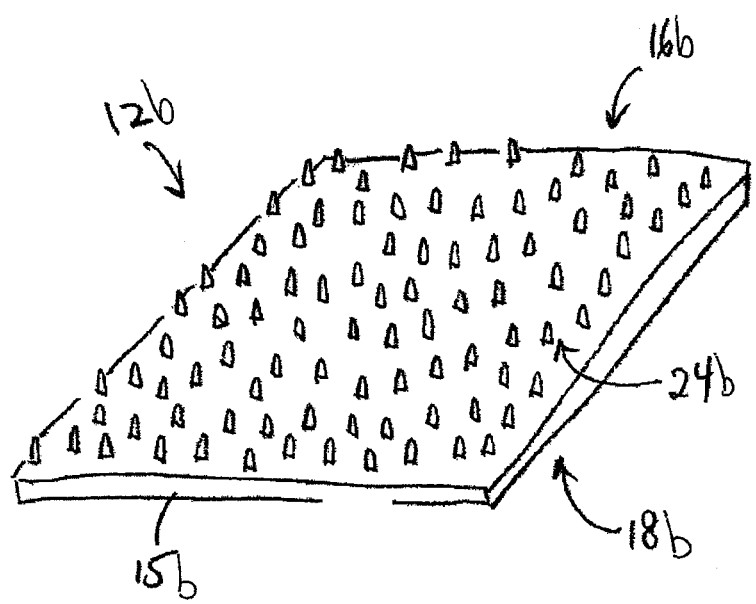
FIG. 8 illustrates in an isometric view, an anchor sheet of the covering module of FIG. 7.
Figure 9:
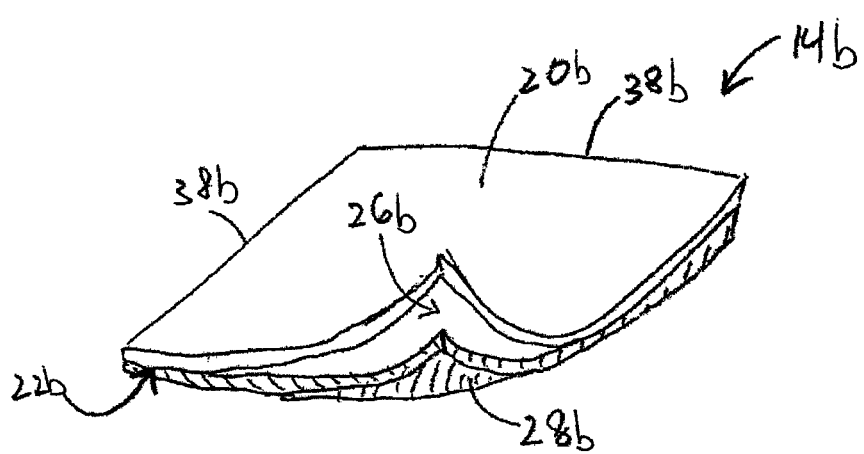
FIG. 9 illustrates in an isometric view, a decorative covering of the covering module of FIG. 7.

FIGS. 8 and 9 illustrate details of the construction of the anchor sheet 12b and of decorative covering 14b respectively, in an example embodiment of the covering module 10b. The anchor sheet 12b may include a substrate 15b, a covering-receiving face, generally shown at 16b and a surface-contacting face, generally shown at 18b. The anchor sheet 12b is typically installed with its surface-contacting face 18b towards the surface. The decorative covering 14b may include a front or decorative face 20b and an opposite back face, generally shown at 22b. The decorative covering 14b is typically installed with its back face 22b towards the anchor sheet 12b. The back face 22b of the decorative covering 14b and the covering-receiving face 16b of the anchor sheet 12b may each comprise a complementary portion of the contact interface. In the example embodiment shown, the decorative covering 14b and the anchor sheet 12b are detachably attachable to each other, and the back face 22b and the covering-receiving face 16b each have respective complementary portions of the contact interface over their entire surface areas for forming the interrupted adhesive bond. In some example embodiments, the decorative covering 14b and the anchor sheet 12b are permanently attached to each other, whether by the interrupted adhesive bond or by some other suitable bond, and may have a component of the contact interface only at joining regions. Some example embodiments of the covering module 10b have the decorative covering 14b and the anchor sheet 12b formed as one piece, and will be described further below.

According to the exemplary embodiment shown in the figures, the contact interface may comprise an interrupted surface 24b, a contact surface 26b, and an adhesive 28b. This counter-intuitive arrangement is different than traditional arrangements which may include an adhesive on one surface which is complimented by another adhesive on the other surface (or by a generally smooth surface for receiving the adhesive). The present embodiment includes non-complementary joining components such as an adhesive on one surface for interfacing with an interrupted surface which would not be associated for use with an adhesive.

It is noted that the illustrations are not to scale. Typically the adhesive 28b is applied to be generally thinner than the decorative covering 14b and the anchor sheet 12b, but these features have been enlarged for ease of visualization.

Unconventionally, the interrupted surface 24b may have one or more protrusions of similar height that come into contact and form an interrupted adhesive bond with the contact surface 26b, with the aid of the adhesive 28b. The interrupted surface 24b, whether provided on the anchor sheet 12b or the decorative covering 14b, may be designed to fully support the decorative covering 14b and any expected weight on top of the decorative covering 14b, such that the decorative covering 14b remains flat and supported on the anchor sheet 12b, for example without any dimpling or collapse between the one or more protrusions on the interrupted surface 24b.

In the example embodiment shown, the interrupted surface 24b is provided on the covering-receiving face 16b of the anchor sheet 12b, and the contact surface 26b is provided on the back face 22b of the decorative covering 14b, although in other example embodiments, the configuration may be vice versa. Similarly, in this example embodiment, the adhesive 28b is shown as being provided on the decorative cover 14b, but may alternatively be provided on the anchor sheet 12b. The contact surface 26b may be a conventional back surface of the decorative covering 14b. In the example embodiment of FIG. 8, the interrupted surface 24b is a regularly interrupted surface, for forming a regularly interrupted adhesive bond with the contact surface 26b, comprising a plurality of protrusions, the protrusions having similar height.

In some examples, the protrusions may be designed to be additionally suitable for a hook and loop joining system when used with a complementary surface having a plurality of loops (e.g., the decorative covering 14 of FIG. 3). For example, the protrusions forming the interrupted surface 24b may comprise hooks (e.g., in a "mushroom" type configuration) suitable for a hook and loop joining system. However, against convention, a complimentary adhesive is employed instead of loops. In another example, the protrusions forming the interrupted surface 24b may comprise uncoined hooks (e.g., just stems without the "mushroom" type heads). Again, against convention, a complimentary adhesive is employed instead of loops. If an anchor sheet having a "mushroom" type configuration is employed, then an installation may include both loop backed decorative coverings and adhesive backed coverings. Similarly, installations having looped backed coverings may be wholly or partially replaced with decorative coverings having adhesive backed coverings. In fact, hybrid decorative coverings having both loops and adhesive may conveniently be used.

Because the adhesive bond between the decorative covering 14b and the anchor sheet 12b is interrupted rather than continuous, it may be relatively easy to separate the decorative covering 14b from the anchor sheet 12b, for example by manually peeling off the decorative covering 14b from the anchor sheet 12b, without the use of additional equipment or heating, although in some example embodiments, equipment may be used, such as for applying heat to the interrupted adhesive bond.

Figure 11A:
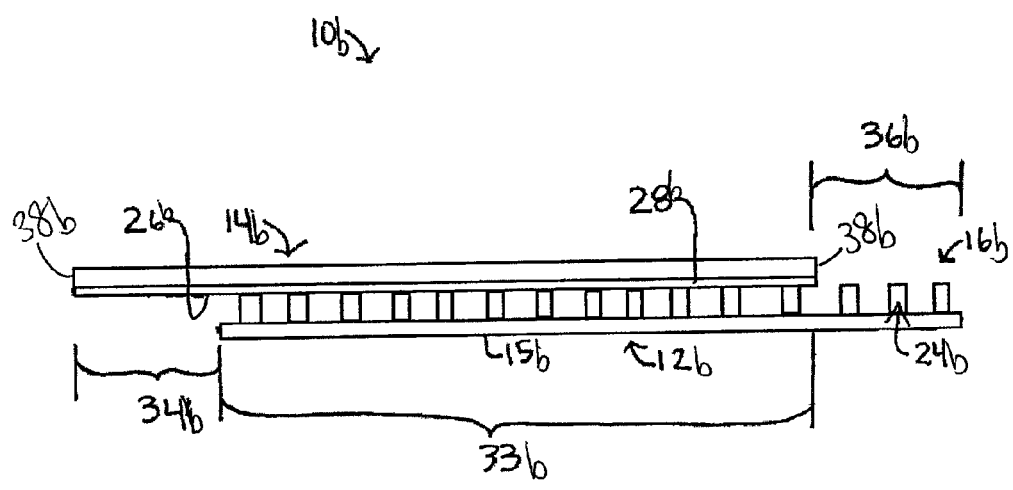
FIG. 11A illustrates a cross-sectional view of the covering module of FIG. 7 along line 4-4 of FIG. 7 in accordance with an example embodiment of the present disclosure.

FIG. 11A illustrates an example embodiment of the covering module 10b, showing defined regions of the anchor sheet 12b and the decorative covering 14b. The anchor sheet has a joining region 36b, described further below, and an anchoring region 33b, for detachable attachment to the decorative covering 14b. The decorative covering 14b also has a joining region 34b, described further below.

Figure 11B:
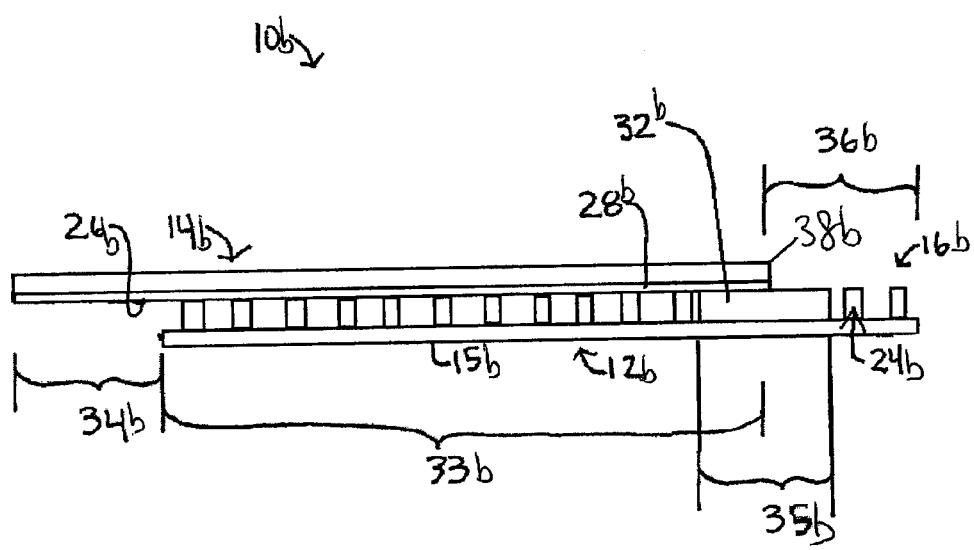
FIG. 11B illustrates a cross-sectional view of the covering module of FIG. 7 along line 4-4 of FIG. 7 in accordance with another example embodiment of the present disclosure.

FIG. 11B illustrates an example embodiment of the covering module 10b having a non-interrupted area, for example using a spacer or other suitable feature. In the example embodiment shown, the covering module 10b may comprise a spacer 32b to create an uninterrupted area, located near or at one or more peripheral edges 38b of the decorative covering 14b. In the example shown, the spacer 32b is partially overlapped by the decorative covering 14b and is located at the peripheral edge 38b of the decorative covering 14b. In other example embodiments, the spacer 32b may be entirely overlapped by the decorative covering 14b, and may be set back from the peripheral edge 38b of the decorative covering 14b. The spacer 32b has a height substantially the same as the one or more protrusions of the interrupted surface 24b.

The spacer 32b may be integrally formed with the anchor sheet 12b or the decorative covering 14b, or may be a separate piece attachable to the anchor sheet 12b, for example by an adhesive bond. Although the spacer 32b is described here as a separate component, the spacer 32b may be formed as an integral part of the interrupted surface 24b (or even the decorative covering), and may be considered as part of the one or more protrusions of the interrupted surface 24b. Where the spacer 32b is a separate component, the interrupted surface 24b, in this example being provided on the anchor sheet 12b, may comprise a region 35b permitting location of the spacer 32b. For example, the region 35 may be free of any protrusions, to allow for detachable attachment of the spacer 32b. In some example embodiments, the spacer 32b may be provided in an intermittent manner such as in a few discrete locations near or at one or more peripheral edges 38b, or only near or at the corners of the decorative covering 14b.

Figure 12A:
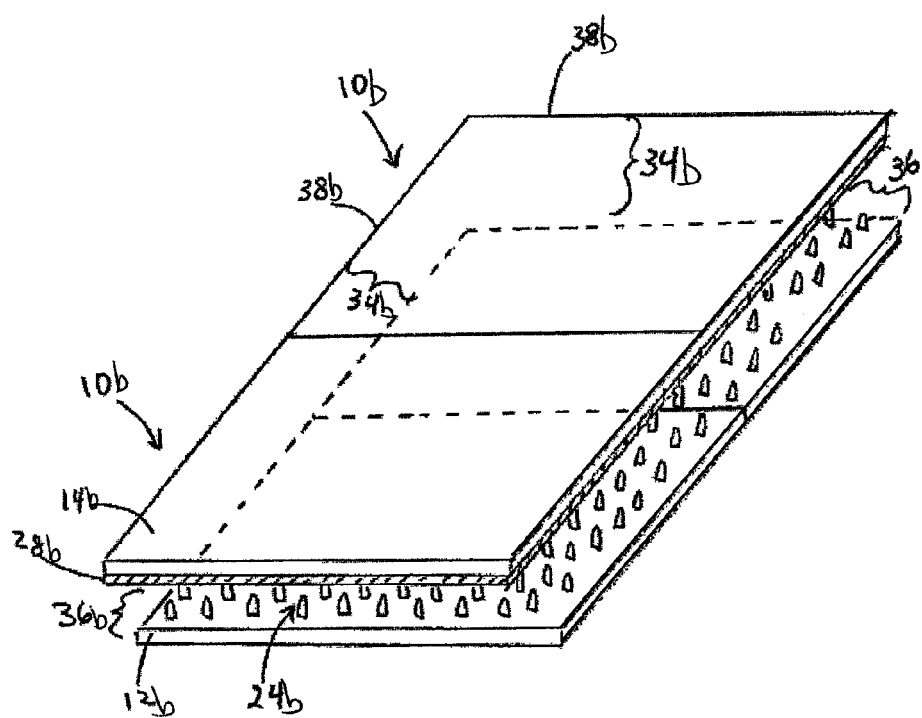
FIG. 12A illustrates in an isometric view, the installation of two covering modules of FIG. 11A.
Figure 12B:
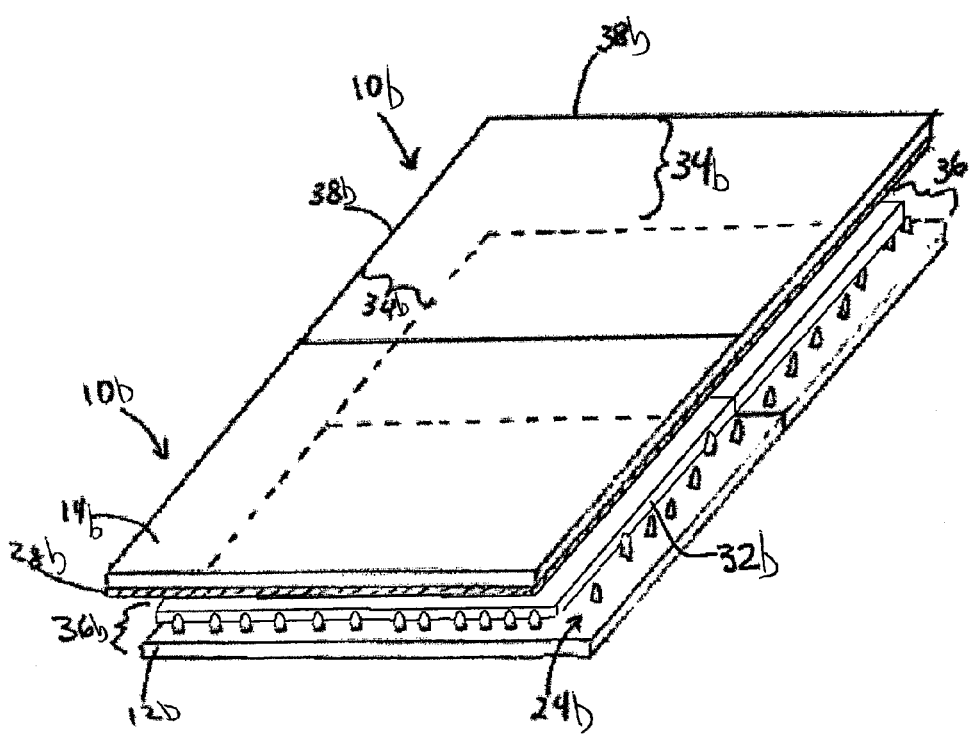
FIG. 12B illustrates in an isometric view, the installation of two covering modules of FIG. 11B.

FIGS. 12A and 12B illustrate how a plurality of covering modules 10b may be detachably attached together in order to form a finished decorative surface when installed over a larger surface (not shown). FIG. 12B illustrates the covering module 10b having the spacer 32b, whereas the covering module of FIG. 12A has no spacer. The following description applies to both FIGS. 12A and 12B. In order to facilitate the attachment of the covering module 10b to one or more adjacent covering modules 10b, the covering module 10b has at least one of a joining region 34b of the back face 22b of the decorative covering 14b; and a joining region 36b of the covering-receiving face 16b of the anchor sheet 12b. Notably, as shown in FIG. 12B, the joining region 34b and the joining region 36b may each include at least a portion of the spacer 32b. The joining region 34b of the decorative covering 14b may be formed by exposing the back face 22b of a portion of the decorative covering 14b extending beyond a periphery of the anchor sheet 12b. Similarly, the joining region 36b of the anchor sheet 12b may be formed by exposing the covering-receiving face 16b of a portion of the anchor sheet 12b extending beyond a periphery of the decorative covering 14b. The joining region 34b of the decorative covering 14b and the joining region 36b of the anchor sheet 12b each comprise a cooperative component of the contact interface.

For example, the joining region 34b of the decorative covering 14b may comprise the contact surface, and the joining region 36b of the anchor sheet 12b may comprise the interrupted surface 24b. In an example embodiment, during installation, the attachment of multiple covering modules 10b together is done by overlapping the joining regions 34b and 36b of each covering module 10b with the complementary joining regions 34b and 36b of adjacent covering modules 10b as shown in FIGS. 12A and 12B. The cooperative components of the contact interface that are disposed on the joining regions 34b and 36b serve to detachably attach adjacent covering modules 10 together.

The interrupted surface 24b on the anchor sheet 12b may be integrally formed with the substrate 15b or the interrupted surface 24b may be otherwise attached to the anchor sheet 12b. Accordingly, the interrupted surface 24b may be molded together as one piece with the substrate 15b. The interrupted surface 24b may be provided in any suitable shape, size and configuration that will form, with the contact surface and the adhesive 28b, an interrupted adhesive bond having suitable adhesive strength. The protrusions 40b may have a height in the range of about 0.01 mm to about 1 cm, or the range of about 0.025 mm to about 1 mm, which may vary depending on the suitability and the specific application.

The interrupted surface 24b may be designed to have a certain configuration of one or more protrusions, in order to provide an interrupted adhesive bond with a selected bond density (e.g., percentage of the area of the total contact interface actually forming an adhesive bond) for a suitable bond strength between the anchor sheet 12b and the decorative covering 14b. For example, the interrupted surface 24b may be designed to provide a bond strength selected based on a necessary peel force required to detach the decorative covering 14b from the anchor sheet 12b. For a given contact surface 26b and a given adhesive, an interrupted surface 24b providing a higher bond density, for example by having a higher proportion of surface area having protrusions (e.g., which may be achieved by having a higher density of protrusions), typically provides a higher bond strength between the anchor sheet 12b and the decorative covering 14b than another interrupted surface 24b providing a lower bond density, for example by having a lower proportion of surface area having protrusions (e.g., having a lower density of protrusions).

For example, the interrupted surface 24b may be designed to have a proportion of surface area having protrusions in the range of about 0.01% to about 50%, or about 0.04% to about 5%. For example, where the interrupted surface 24b comprises a plurality of protrusions, the protrusions may have a density in the range of about 50 to about 2000 protrusions per square inch. In some examples, the protrusions have a density in the range of about 200 to about 1600 protrusions per square inch. Where the density of protrusions is higher (e.g., in the range of about 1000 to about 2000 protrusions per square inch), the protrusions may be referred to as micro-protrusions. In some examples, the protrusions have a density in the range of about 100 to about 250 protrusions per square inch. Alternatively, for a given interrupted surface 24b, the contact surface 26b or the adhesive 28b may be designed to provide a selected bond strength, for example by using a stronger or weaker adhesive or by using a material for the contact surface 26b or the interrupted surface 24b that is more or less receptive to the adhesive 28b, or by designing an interrupted surface 24b that is less receptive to the adhesive 28b (e.g., by decreasing the proportion of surface area having protrusions or by changing the shape of the protrusions).

Example embodiments of the anchor sheet 12b showing different example embodiments of the interrupted surface 24b are shown in FIGS. 13A, 13B, 13C, 13D and 13E.

Figure 13A:
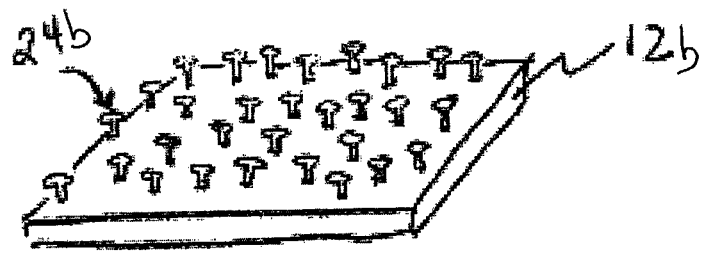
FIGS. 13A-13E illustrate isometric views of example embodiments of anchor sheets suitable for the covering module of FIG. 7.

In the example shown in FIG. 13A, the interrupted surface 24b comprises a plurality of protrusions having similar height, each protrusion having an essentially mushroom shape, which may also be used as hooks in a hook and loop joining system. Such a design may allow the interrupted surface 24b, for example being provided on the anchor sheet 12b, to be used in both adhesive-based joining systems and in hook and loop joining systems. Such a design may allow the anchor sheet 12b to be used with decorative coverings 14b designed for either adhesive-based joining systems or hook and loop joining systems, providing advantageous and non-intuitive flexibility for the covering module 10b and for the anchor sheet 12b, in examples where the anchor sheet 12b may be provided separate from the decorative covering 14b. This same advantage and flexibility may be found where the interrupted surface 24b comprises a plurality of hooks. The mushroom shape may be used in order to simplify the tooling required for injection molding the substrate 15b compared to a hook shape.

Figure 13B:
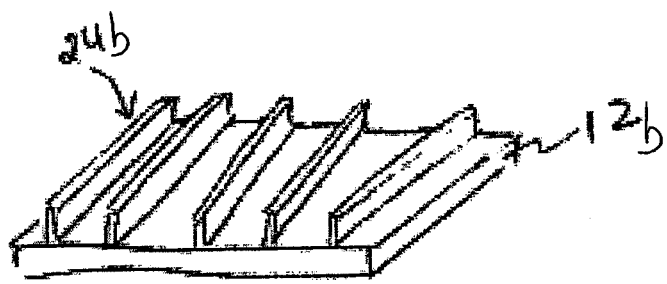

In the example embodiment shown in FIG. 13B, the interrupted surface 24b comprises a plurality of ridges having similar height. This design may simplify manufacture of the anchor sheet 12b, because the ridges may be formed simply by removing rows of material from the substrate 15b, for example using conventional machining, grooving, or extrusion methods.

Figure 13C:
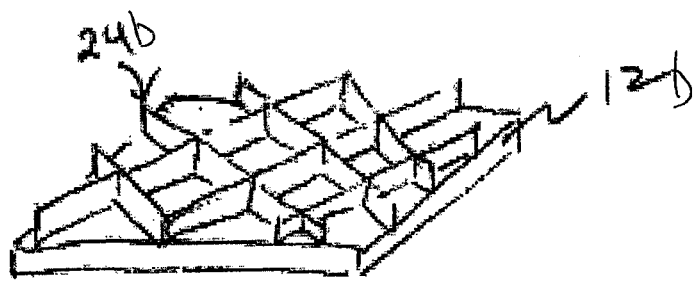

In the example embodiment shown in FIG. 13C, the interrupted surface 24b comprises a raised crosshatch pattern, which may be formed from the substrate 15b using conventional techniques. This design demonstrates that the interrupted surface 24b need not comprise a plurality of protrusions, but may comprise a single interrupted protrusion in order to form the interrupted adhesive bond. Other designs for the interrupted surface 24b may include spikes, posts, stems, and protruding plates among others.

Figure 13D:
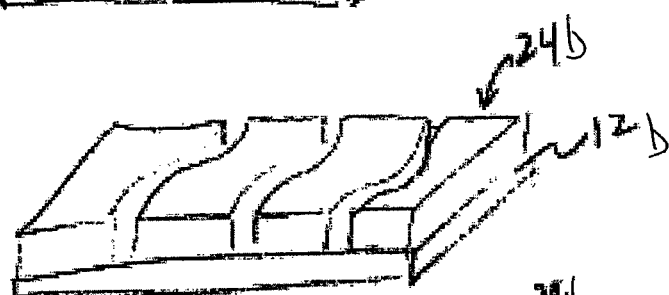

In the example embodiment shown in FIG. 13D, the interrupted surface 24b comprises a plurality of grooves. Similar to the example shown in FIG. 13B, this design may simplify manufacture of the anchor sheet 12b, because the grooves may be formed simply by removing rows of material from the substrate 15b, for example using conventional machining, grooving, or injection molding methods.

Figure 13E:
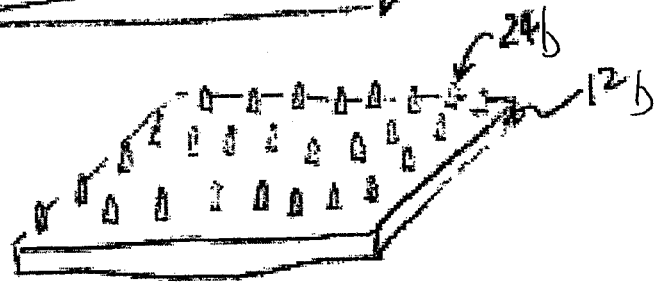

In the example embodiment shown in FIG. 13E, the interrupted surface 24b comprises a plurality of protrusions having similar height, each protrusion having an essentially post shape. The protrusions may be in a regular pattern. This design may also be used to form the example of FIG. 13A by melting or otherwise deforming a portion of each post to form a mushroom shape.

In some examples, the interrupted surface 24b may be designed to minimize moisture seepage. In particular, the interrupted surface 24b comprising rows or grooves, or where the spaces between protrusions are isolated or not interconnected may be useful to minimize moisture seepage. By isolating the spaces between protrusions, any moisture that seeps in between the anchor sheet 12b and the decorative covering 14b is retained within an isolated space and cannot seep into other spaces.

Figure 14:
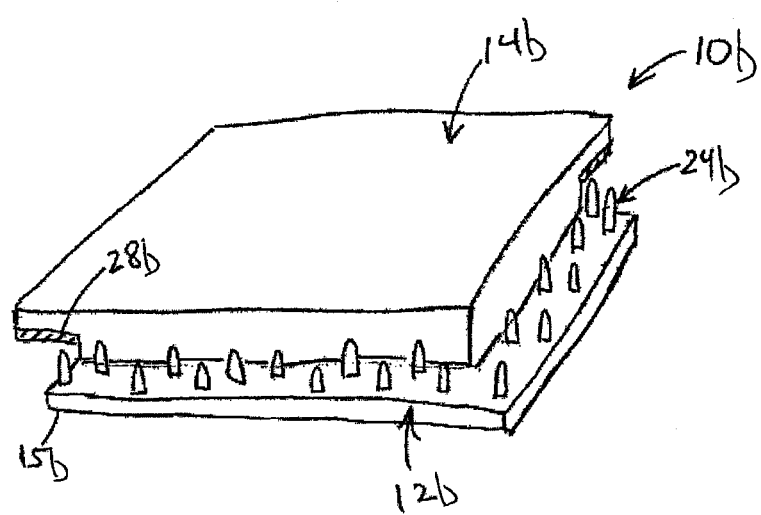
FIG. 14 illustrates in an isometric view, a covering module in accordance with an example embodiment of the present disclosure.

FIG. 14 illustrates an example embodiment of the covering module 10b in which the decorative covering 14b and the anchor sheet 12b are formed in one piece, such as a unitary module. This is an example of a covering module 10b where the decorative covering 14b and the anchor sheet 12b are permanently attached. The covering module 10b in this example is formed in a single piece, for example using injection molding. At least a portion of the decorative covering 14b is integral with at least a corresponding portion of the anchor sheet 12b. The interrupted surface 24b, in this example provided at the joining region 36b of the anchor sheet 12b, may be molded, for example by injection molding, or may be machined, milled or routed out from the substrate 15b. The adhesive 28b, in this example provided at the joining region 34b of the decorative covering 14b, may be added to the covering module 10b in a later step. In other examples, the decorative covering 14b and the anchor sheet 12b may be formed separately and permanently attached to each other in a later step, such as by fusing, melting or applying a permanent adhesive.

An advantage of the covering module 10b having the interrupted adhesive bond, rather than a continuous adhesive bond (e.g., an adhesive bond formed between two smooth surfaces) is the ease of detachment of the decorative covering 14b from the anchor sheet 12b, because the adhesive bond is interrupted in the contact interface, while maintaining the inhibition of any lateral movement between the decorative covering 14b and the anchor sheet 12b through the strength of the adhesive bond.

Another advantage provided by the covering module 10b having the interrupted adhesive bond is that the decorative covering 14b can easily be removed and replaced with a new decorative covering 14b for reasons such as if it becomes damaged. Once installed, the decorative covering 14b may be removed independently from the anchor sheet 12b and replaced, or an entire covering module 10b may be removed altogether if it needs to be moved and installed at a different location. This provides the option of uninstalling a covering module 10b without damaging it and reusing it at a different location if desired. Depending on the strength of the adhesive bond, which may depend on the type of adhesive that is used and the configuration of the interrupted surface 24b, the covering module 10b, or only the decorative covering 14b, may be uninstalled without the use of tools. Alternatively, in other cases, it may be necessary to apply heat to the area in question in order to loosen the adhesive during removal or to re-activate its adhesive properties during installation. Care should be taken so as to reduce contamination of the adhesive from dust or other materials during installation. Where the adhesive is provided on the decorative covering 14b (e.g., on the contact surface 26b provided on the back face 22b of the decorative covering 14b) a replacement decorative covering 14b could be provided with a replacement adhesive, thus ensuring that there is a full-strength interrupted adhesive bond formed. The covering module 10b also reduces concern regarding the condition of the surface or subsurface over which it is being applied (e.g., presence of any moisture), since the decorative covering 14b is not being applied directly to the surface or subsurface.

Example 3

Figure 15:
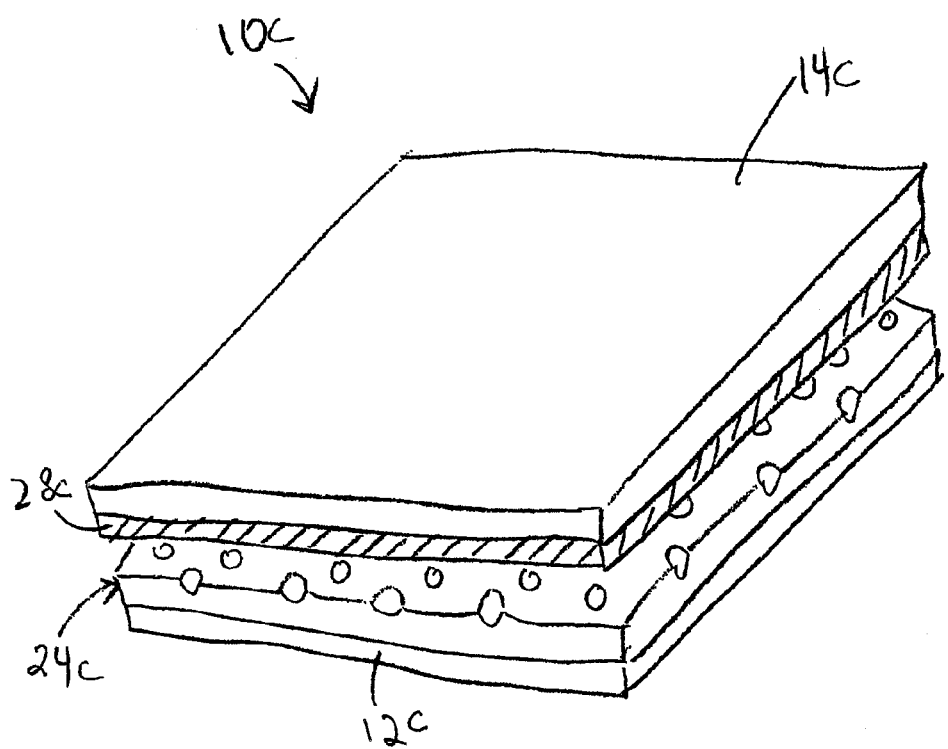
FIG. 15 illustrates in an isometric view, a covering module in accordance with an example embodiment of the present disclosure.

FIG. 15 illustrates another example covering module, generally shown at 10c, in accordance with an example embodiment of the present disclosure. The covering module 10c includes a decorative covering 14c and an anchor sheet 12c. The decorative covering 14c and the anchor sheet 12c are attached, and the covering module 10c includes at least one joining region (described below) for attachment to at least one adjacent module. The joining region has a cooperative component of a contact interface for forming an adhesive bond with the adjacent module. At least one surface in the adhesive bond is a compartmentalized surface. The compartmentalized surface may also lead to the formation of an interrupted adhesive bond. In some example embodiments, the covering module 10c has joining regions having complementary components of the contact interface, as will be described below.

Figure 16:
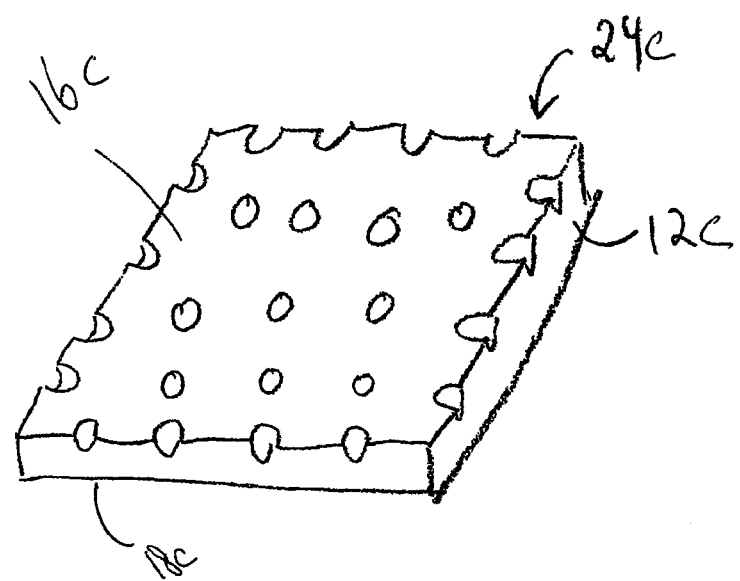
FIG. 16 illustrates in an isometric view, an anchor sheet of the covering module of FIG. 15.
Figure 17:
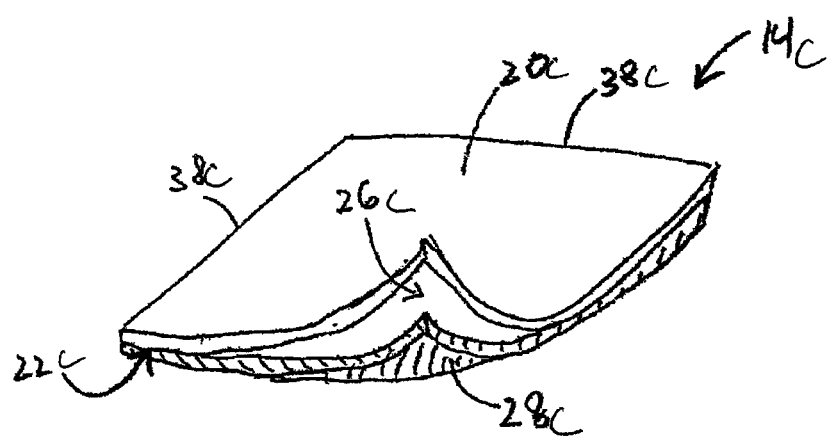
FIG. 17 illustrates in an isometric view, a decorative covering of the covering module of FIG. 15.

FIGS. 16 and 17 illustrate details of the construction of the anchor sheet 12c and of decorative covering 14c respectively, in an example embodiment of the covering module 10c. The anchor sheet 12c may include a substrate 15c, a covering-receiving face, generally shown at 16c and a surface-contacting face, generally shown at 18c. The covering-receiving face 16c may be provided with the compartmentalized surface 24c in at least joining regions of the anchor sheet 12c. The anchor sheet 12c is typically installed with its surface-contacting face 18c towards the surface. The decorative covering 14c may be similar to the decorative covering 14b. The decorative covering 14c may include a front or decorative face 20c and an opposite back face, generally shown at 22c. The decorative covering 14c is typically installed with its back face 22c towards the anchor sheet 12c. The back face 22c of the decorative covering 14c and the covering-receiving face 16c of the anchor sheet 12c may each comprise a complementary portion of the contact interface. In the example embodiment shown, the decorative covering 14c and the anchor sheet 12c are detachably attachable to each other, and the back face 22c and the covering-receiving face 16c each have respective complementary portions of the contact interface over their entire surface areas for forming the interrupted adhesive bond. In some example embodiments, the decorative covering 14c and the anchor sheet 12c are permanently attached to each other, whether by the interrupted adhesive bond or by some other suitable bond, and may have a component of the contact interface only at joining regions. Some example embodiments of the covering module 10c have the decorative covering 14c and the anchor sheet 12c formed as one piece, and will be described further below.

According to the exemplary embodiment shown in the figures, the contact interface may comprise a compartmentalized surface 24c, a contact surface 26c, and an adhesive 28c. This counter-intuitive arrangement is different than traditional arrangements which may include an adhesive on one surface which is complimented by another adhesive on the other surface (or by a generally smooth surface for receiving the adhesive). The present embodiment includes non-complementary joining components such as an adhesive on one surface for interfacing with an uneven or interrupted surface (i.e., having compartments) which would not be associated for use with an adhesive.

It is noted that the illustrations are not to scale. Typically the adhesive 28c is applied to be generally thinner than the decorative covering 14c and the anchor sheet 12c, but these features have been enlarged for ease of visualization. Similarly, the compartments of the compartmentalized surface 24c typically are relatively small compared to the dimensions of the decorative covering 14c and the anchor sheet 12c and may even be undetectable by touch and/or the naked eye.

Unconventionally, the compartmentalized surface 24c may have or define one or more recessions, voids, or compartments, separate from each other, such that only the remaining portion of the compartmentalized surface 24c comes into contact with and forms an adhesive bond with the contact surface 26c, with the aid of the adhesive 28c. The compartmentalized surface 24c, whether provided on the anchor sheet 12c or the decorative covering 14c, may be designed to fully support the decorative covering 14c and any expected weight on top of the decorative covering 14c, such that the decorative covering 14c remains flat and supported on the anchor sheet 12c, for example without any dimpling or collapse in the one or more voids on the compartmentalized surface 24c. In some examples, the voids on or defined by the compartmentalized surface 24c may extend through the thickness of the anchor sheet 12c, or be presented on either side thereof, forming apertures through the anchor sheet 12c. In some examples, the compartmentalized surface 24c may be referred to as having a honeycomb surface, a waffled surface, a grill surface, or having reservoirs, dimples, or wells, or other such features and variations thereof.

In the example embodiment shown, the compartmentalized surface 24c is provided on the covering-receiving face 16c of the anchor sheet 12c, and the contact surface 26c is provided on the back face 22c of the decorative covering 14c, although in other example embodiments, the configuration may be vice versa. Similarly, in this example embodiment, the adhesive 28c is shown as being provided on the decorative cover 14c, but may alternatively be provided on the anchor sheet 12c. The contact surface 26c may be a conventional back surface of the decorative covering 14c. In the example embodiment of FIG. 16, the compartmentalized surface 24c has a regular arrangement of voids, the voids having similar depth. Although not shown, in other examples, the compartmentalized surface 24c may have an irregular arrangement of voids and/or the voids may be dissimilar (e.g., having dissimilar depths and/or dissimilar geometries).

In some examples, the compartmentalized surface 24c may comprise portions of a surface with voids interspersed with protrusions designed to be suitable for a hook and loop joining system when used with a complementary surface having a plurality of loops. The protrusions may have a height similar to the height of the surface with voids, such that the decorative covering 14c is evenly supported. For example, the protrusions may comprise hooks (e.g., in a "mushroom" type configuration) suitable for a hook and loop joining system. In another example, the protrusions may comprise uncoined hooks (e.g., just stems without the "mushroom" type heads). Such an arrangement, including both voids and protrusions, may allow the covering module 10c be compatible with both loop-backed decorative coverings and adhesive-backed coverings. In fact, hybrid decorative coverings having both loops and adhesive may conveniently be used.

Because of the presence of voids in the compartmentalized surface 24c, the adhesive bond between the decorative covering 14c and the anchor sheet 12c may be interrupted rather than continuous. This may allow it to be relatively easy to separate the decorative covering 14c from the anchor sheet 12c, for example by manually peeling off the decorative covering 14c from the anchor sheet 12c, without the use of additional equipment or heating, although in some example embodiments, equipment may be used, such as for applying heat to the adhesive bond.

Figure 18A:
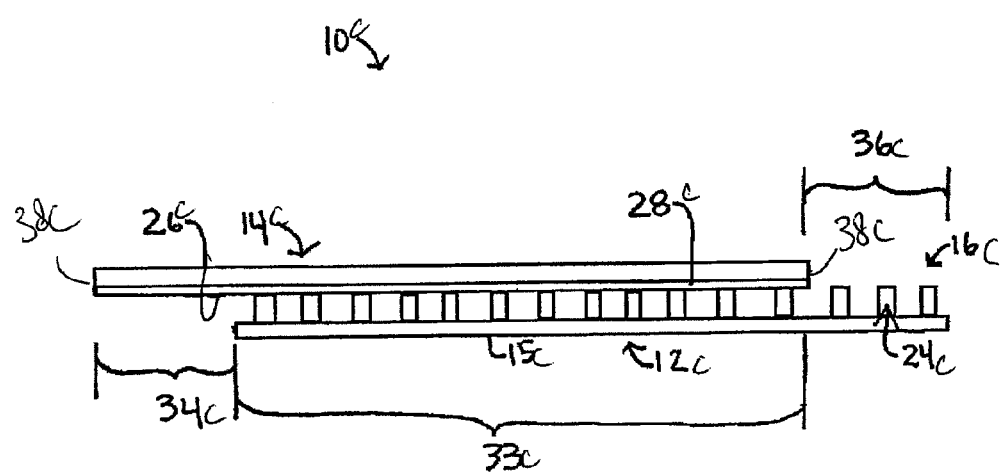
FIG. 18A illustrates a cross-sectional view of the covering module of FIG. 15 in accordance with an example embodiment of the present disclosure.

FIG. 18A illustrates an example embodiment of the covering module 10c, showing defined regions of the anchor sheet 12c and the decorative covering 14c. The anchor sheet has a joining region 36c, described further below, and an anchoring region 33c, for detachable attachment to the decorative covering 14c. The decorative covering 14c also has a joining region 34c, described further below.

Figure 18B:
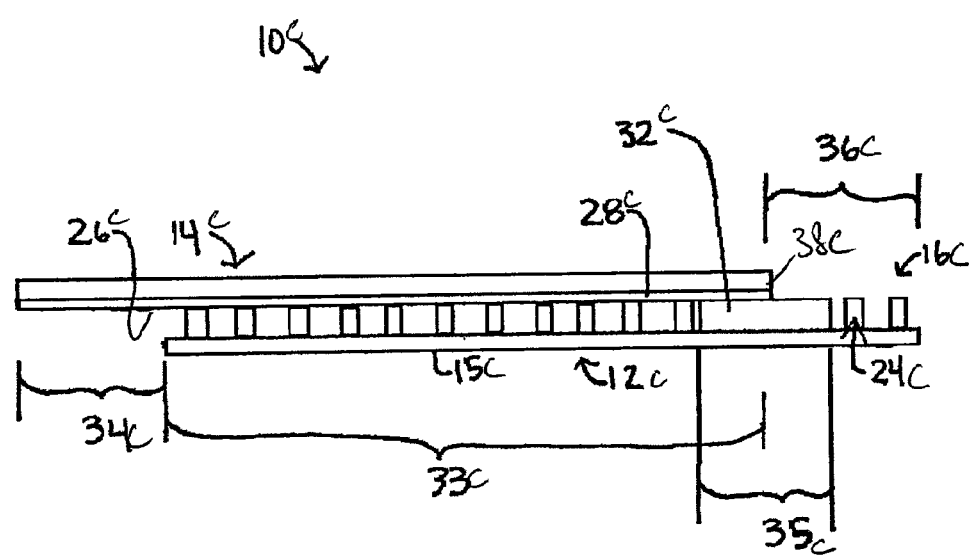
FIG. 18B illustrates a cross-sectional view of the covering module of FIG. 15 along in accordance with another example embodiment of the present disclosure.

FIG. 18B illustrates an example embodiment of the covering module 10c having an area without voids for forming the adhesive bond, for example using a spacer or other suitable feature. In the example embodiment shown, the covering module 10c may comprise an uninterrupted or non-recessed area, also referred to as a spacer 32c, located near or at one or more peripheral edges 38c of the decorative covering 14c. In the example shown, the spacer 32c is partially overlapped by the decorative covering 14c and is located at the peripheral edge 38c of the decorative covering 14c. In other example embodiments, the spacer 32c may be entirely overlapped by the decorative covering 14c, and may be set back from the peripheral edge 38c of the decorative covering 14c. The spacer 32c has a height substantially the same as the non-recessed portions of the compartmentalized surface 24c. The spacer 32c may be integrally formed with the anchor sheet 12c or the decorative covering 14c, and may be considered as part of the non-recessed portions of the compartmentalized surface 24c. In some example embodiments, the spacer 32c may be provided in an intermittent manner such as in a few discrete locations near or at one or more peripheral edges 38c, or only near or at the corners of the decorative covering 14c.

Figure 19A:
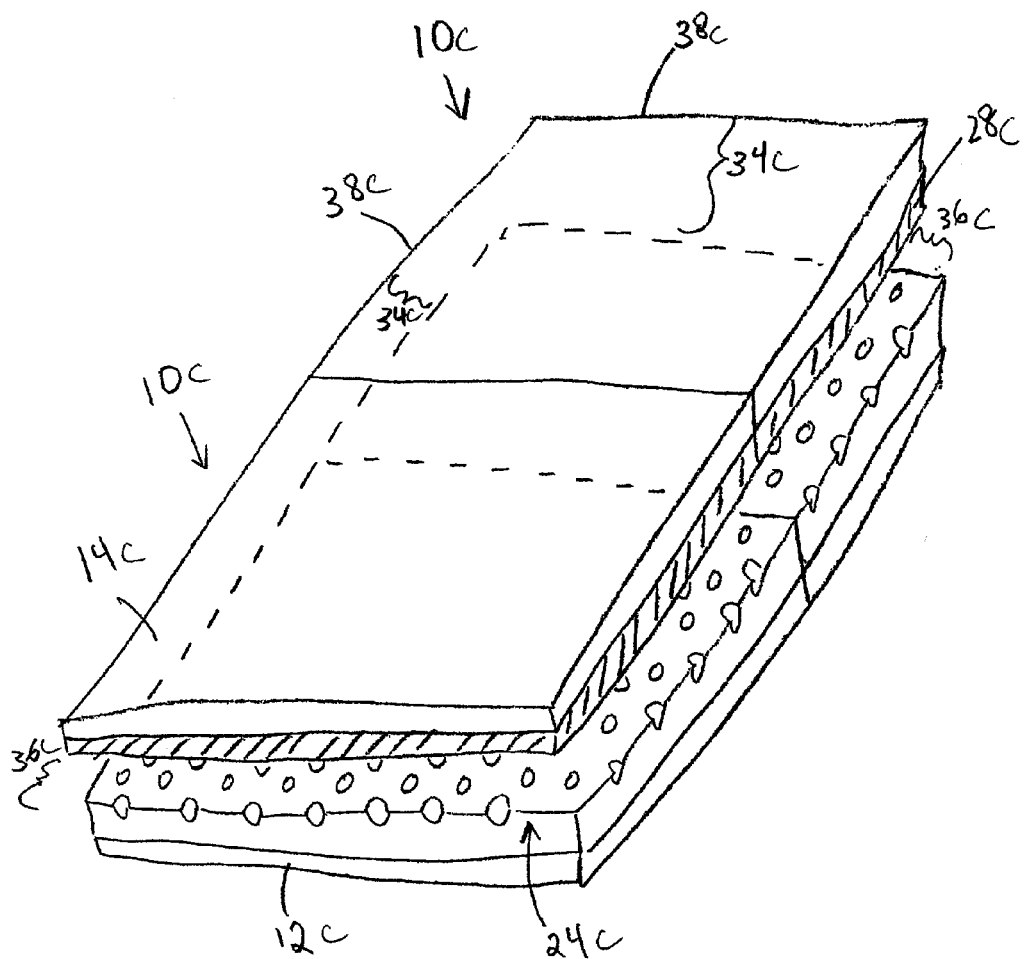
FIG. 19A illustrates in an isometric view, the installation of two covering modules of FIG. 18A.
Figure 19B:
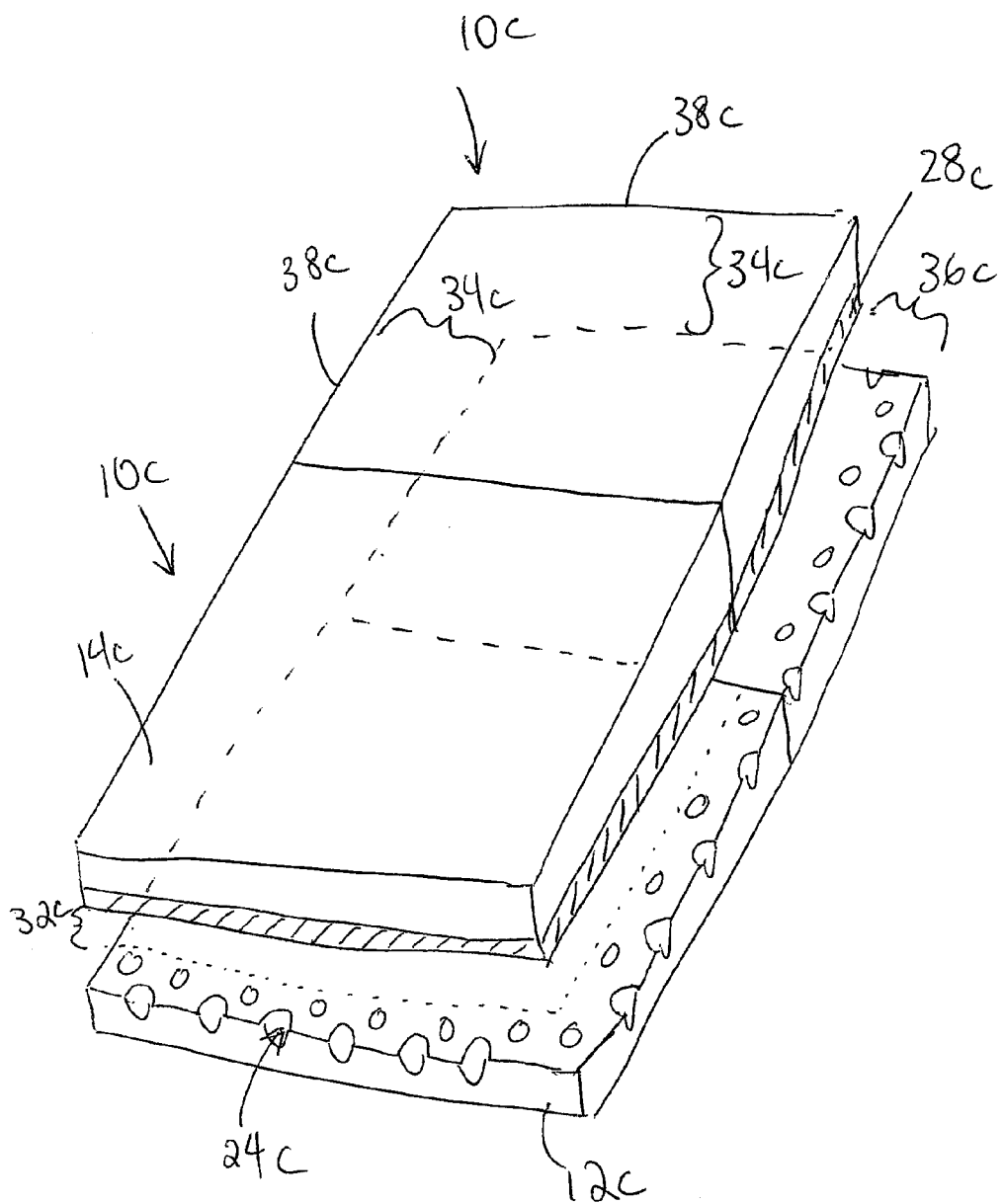
FIG. 19B illustrates in an isometric view, the installation of two covering modules of FIG. 18B.
Figure 19C:
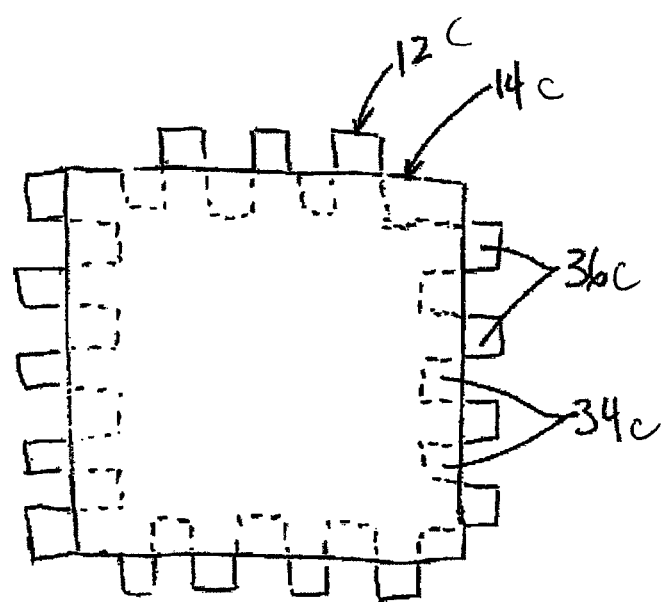
FIG. 19C illustrates a top plan view of the covering module in accordance with another example embodiment.

FIGS. 19A and 19B illustrate how a plurality of covering modules 10c may be detachably attached together in order to form a finished decorative surface when installed over a larger surface (not shown). FIG. 19B illustrates the covering module 10c having the spacer 32c (i.e., non-recessed area indicated by dotted line), whereas the covering module of FIG. 19A has no spacer. The following description applies to both FIGS. 19A and 19B. In order to facilitate the attachment of the covering module 10c to one or more adjacent covering modules 10c, the covering module 10c has at least one of a joining region 34*c* of the back face 22*c* of the decorative covering 14*c*; and a joining region 36*c* of the covering-receiving face 16*c* of the anchor sheet 12*c*. Notably, as shown in FIG. 19B, the joining region 34*c* and the joining region 36*c* may each include at least a portion of the spacer 32*c*. The joining region 34*c* of the decorative covering 14*c* may be formed by exposing the back face 22*c* of a portion of the decorative covering 14*c* extending beyond a periphery of the anchor sheet 12*c*.

Similarly, the joining region 36*c* of the anchor sheet 12*c* may be formed by exposing the covering-receiving face 16*c* of a portion of the anchor sheet 12*c* extending beyond a periphery of the decorative covering 14*c*. The joining region 34*c* of the decorative covering 14*c* and the joining region 36*c* of the anchor sheet 12*c* each comprise a cooperative component of the contact interface. For example, the joining region 34*c* of the decorative covering 14*c* may comprise the contact surface, and the joining region 36*c* of the anchor sheet 12*c* may comprise the compartmentalized surface 24*c*. In an example embodiment, during installation, the attachment of multiple covering modules 10*c* together is done by overlapping the joining regions 34*c* and 36*c* of each covering module 10*c* with the complementary joining regions 34*c* and 36*c* of adjacent covering modules 10*c* as shown in FIGS. 19A and 19B. The cooperative components of the contact interface that are disposed on the joining regions 34*c* and 36*c* serve to detachably attach adjacent covering modules 10*c* together.

The compartmentalized surface 24*c* may be useful for impeding seepage of liquids between the decorative covering 14*c* and the anchor sheet 12*c*. For example, in the arrangement of FIG. 19A, it may be possible for liquid to seep in where the edges 38*c* of adjacent covering modules 10*c* meet. The compartmentalized surface 24*c* may be similarly useful in impeding seepage of liquids from the surface. For example, concrete surfaces may exude moisture over time (e.g., due to pressure), which may seep up into the joining regions 34*c* and 36*c*. The presence of liquid in the joining regions 34*c* and 36*c* may impair the strength of the adhesive bond, for example where the adhesive 28*c* is sensitive to liquids. Because the compartmentalized surface 24*c* includes separate voids, any liquid that seeps in and reaches the anchor sheet is retained in one or more voids or inhibited from flowing, and prevented from seeping further through to other areas of the joining regions 34*c* and 36*c*. A liquid-filled void may also serve to form a barrier against further seepage. Thus, any unwanted seepage of liquids is effectively contained to the immediate seepage area and prevented from spreading. This may help to limit any weakening of the adhesive bond due to liquid seepage.

The compartmentalized surface 24*c* on the anchor sheet 12*c* may be integrally formed with the substrate 15*c* or the compartmentalized surface 24*c* may be otherwise attached to the anchor sheet 12*c*. Accordingly, the compartmentalized surface 24*c* may be molded together as one piece with the substrate 15*c*, or the compartmentalized surface 24*c* may be carved or etched out from the substrate 15*c*. The compartmentalized surface 24*c* may be provided in any suitable shape, size and configuration that will form separate voids and create, with the contact surface and the adhesive 28*c*, an interrupted adhesive bond having suitable adhesive strength. The compartmentalized surface 24*c* may be designed to have a certain configuration of one or more voids, in order to provide an adhesive bond (in particular, an interrupted adhesive bond) with a selected bond density (e.g., percentage of the area of the total contact interface actually forming an adhesive bond) for a suitable bond strength between the anchor sheet 12*c* and the decorative covering 14*c*.

For example, the compartmentalized surface 24*c* may be designed to provide a bond strength selected based on a necessary peel force required to detach the decorative covering 14*c* from the anchor sheet 12*c*. For a given contact surface 26*c* and a given adhesive, an compartmentalized surface 24*c* providing a higher bond density, for example by having a higher proportion of non-recessed surface area (e.g., which may be achieved by having a lower density of voids), typically provides a higher bond strength between the anchor sheet 12*c* and the decorative covering 14*c* than another compartmentalized surface 24*c* providing a lower bond density, for example by having a lower proportion of non-recessed surface area (e.g., having a higher density of voids). For example, the compartmentalized surface 24*c* may be designed to have a proportion of surface area having voids in the range of about 0.01% to about 50%, or about 0.04% to about 5%. In some examples, the compartmentalized surface 24 may include a relatively high density of relatively small voids, forming a pattern that may be referred to as a "microgrid". The voids may have a depth in the range of about 0.01 mm to about 1 cm, or the range of about 0.025 mm to about 1 mm, which may be dependent on the thickness of the anchor sheet, and may vary based on the suitability and application.

In some examples, for a given compartmentalized surface 24*c*, the contact surface 26*c* or the adhesive 28*c* may be designed to provide a selected bond strength, for example by using a stronger or weaker adhesive or by using a material for the contact surface 26*c* or the compartmentalized surface 24*c* that is more or less receptive to the adhesive 28*c*, or by designing an compartmentalized surface 24*c* that is less receptive to the adhesive 28*c* (e.g., by increasing the proportion of surface area having voids).

Example embodiments of the anchor sheet 12*c* showing different example embodiments of the compartmentalized surface 24*c* are shown in FIGS. 20A, 20B, 20C, 20D and 20E. In each of the example embodiments, the compartmentalized surface 24*c* may be formed directly on the anchor sheet 12*c* using conventional techniques (e.g., by etching or machining) or may be formed separately by conventional techniques and bonded to the substrate 15*c*.

Figure 20A:
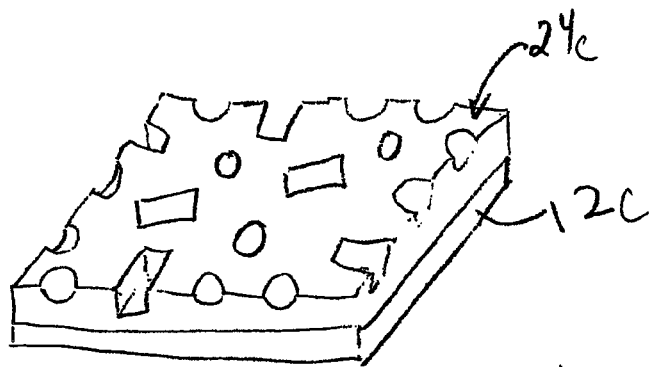
FIGS. 20A-20E illustrate isometric views of example embodiments of anchor sheets suitable for the covering module of FIG. 15.

In the example embodiment shown in FIG. 20A, the compartmentalized surface 24*c* comprises dissimilar voids arranged in an irregular pattern.

Figure 20B:
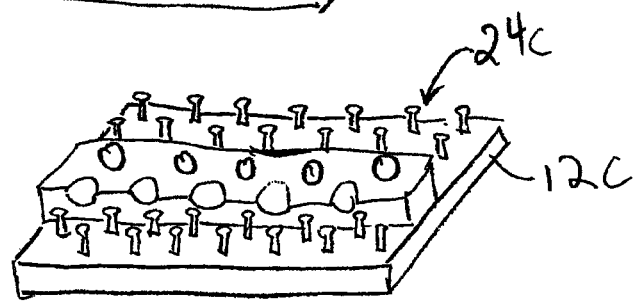

In the example embodiment shown in FIG. 20B, the compartmentalized surface 24*c* includes both voids and protrusions suitable for a hook and loop joining system.

Figure 20C:
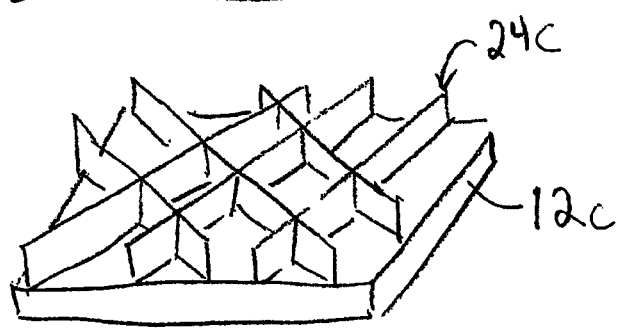

In the example embodiment shown in FIG. 20C, the compartmentalized surface 24*c* comprises a raised cross-hatch pattern.

Figure 20D:
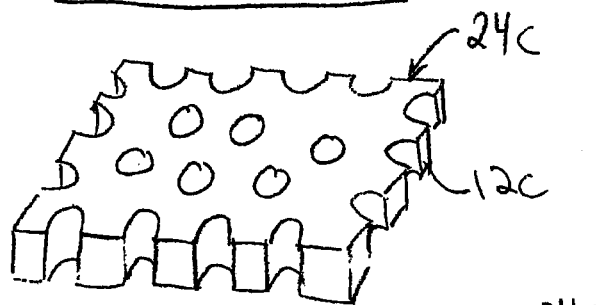

In the example embodiment shown in FIG. 20D, the compartmentalized surface 24*c* includes voids that extend through the entire thickness of the anchor sheet 12*c*, thereby forming apertures.

Figure 20E:
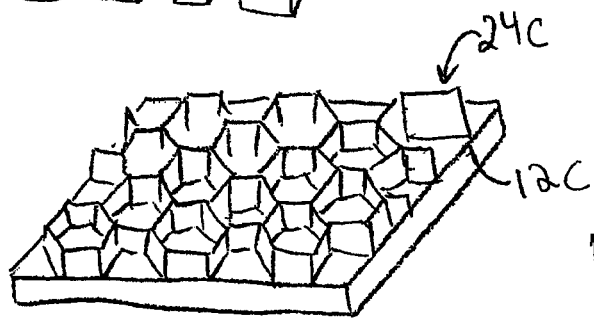

In the example embodiment shown in FIG. 20E, the compartmentalized surface 24*c* includes a raised honeycomb pattern.

Figure 21:
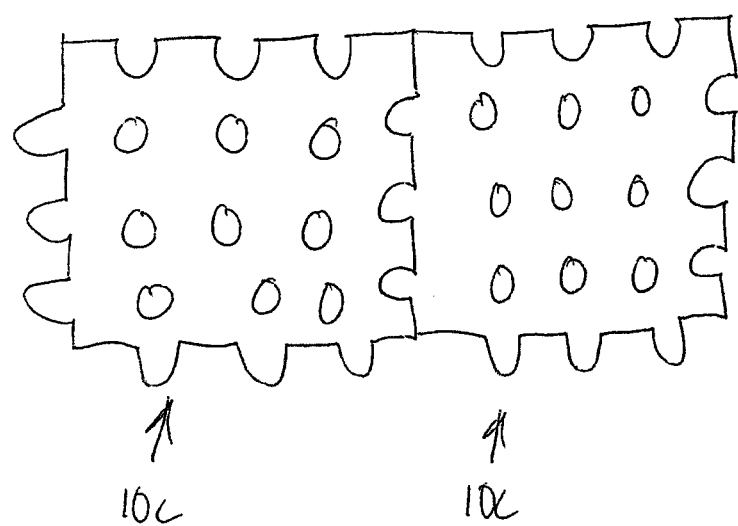
FIG. 21 illustrates an example installation of two anchor sheets suitable for the covering module of FIG. 15.

FIG. 21 illustrates an example of the anchor sheet 12*c* wherein the voids form apertures and also form interlocking patterns on the peripheral edges, such that anchor sheets 12*c* of adjacent covering modules 10*c* may interlock with each other. This may be useful to prevent lateral shifting of installed adjacent covering modules 10*c*. Where decorative coverings 14*c* are already attached to the anchor sheets 12*c* (e.g., where the decorative coverings 14*c* are integral with the anchor sheets 12c), the interlocking may also help to match up the peripheral edges 38c of the decorative coverings 14c, thereby helping to ensure a tight seam between adjacent decorative coverings 14c.

Figure 22:
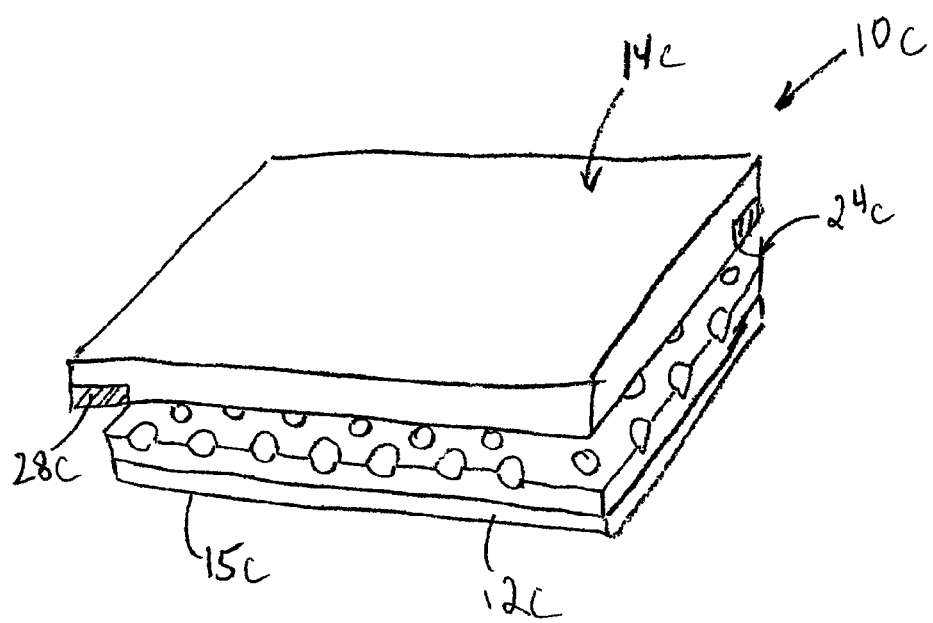
FIG. 22 illustrates in an isometric view, a covering module in accordance with an example embodiment of the present disclosure.

FIG. 22 illustrates an example embodiment of the covering module 10c in which the decorative covering 14c and the anchor sheet 12c are formed in one piece, such as a unitary module. This is an example of a covering module 10c where the decorative covering 14c and the anchor sheet 12c are permanently attached. The covering module 10c in this example is formed in a single piece, for example using injection molding. At least a portion of the decorative covering 14c is integral with at least a corresponding portion of the anchor sheet 12c. The interrupted surface 24c, in this example provided at the joining region 36c of the anchor sheet 12c, may be molded, for example by injection molding, or may be machined, milled or routed out from the substrate 15c. The adhesive 28c, in this example provided at the joining region 34c of the decorative covering 14c, may be added to the covering module 10c in a later step. In other examples, the decorative covering 14c and the anchor sheet 12c may be formed separately and permanently attached to each other in a later step, such as by fusing, melting or applying a permanent adhesive.

Figure 23A:
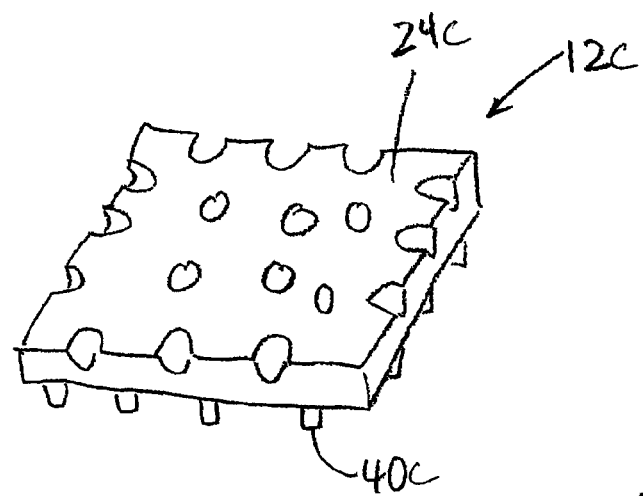
FIGS. 23A-23C illustrate isometric views of example embodiments of anchor sheets having protrusions on a surface-contacting face.
Figure 23B:
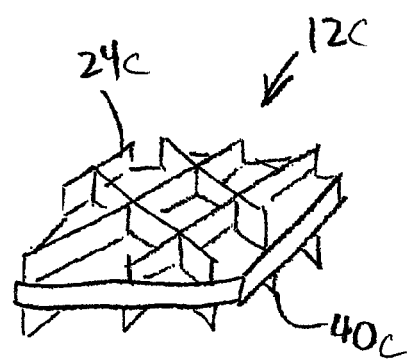
Figure 23C:
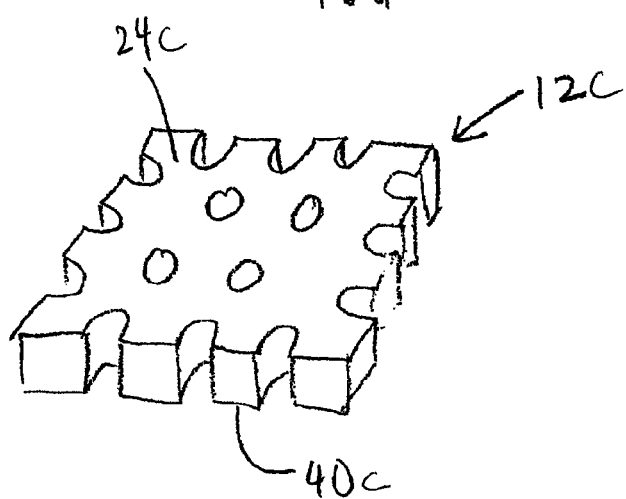

FIG. 23A illustrates an example in which the anchor sheet 12c is provided with protrusions 40c projecting or extending from its surface-contacting face 18c, thereby elevating or spacing the anchor sheet 12c from the surface. This may be useful in allowing any liquid that has seeped into the joining regions 34c, 36c to drain out. This may also be useful in preventing moisture from the surface from seeping into the joining regions 34c, 36c. This may also be useful in helping to promote evaporation of any moisture on the surface, by allowing at least some airflow between the covering module 10c and the surface. In the example shown, the protrusions 40c are substantially similar in height, such that the anchor sheet 12c is evenly supported on the surface. The protrusions 40c may also be provided at a suitable density and/or size (e.g., the protrusions 40c may cover about 0.01% to 50% of the surface-contacting face 18c and/or at a density of about 100 to 500 per square inch) to support weight placed on the anchor sheet 12c. The protrusions 40c may have a height of about 1 mm to about 7 mm, which may vary depending on suitability and application. The protrusions 40c may also have a width that is suitable to the application (e.g., the weight to be supported). In some examples, the protrusions 40c may form a compartmentalized surface (e.g., symmetrical to the compartmentalized surface 24), as shown in FIG. 23B. Where the compartmentalized surface 24c includes apertures (e.g., in the example shown in FIG. 20D), the protrusions 40c may be defined by the surface-contacting side of the apertures (as indicated in FIG. 23C). Although the anchor sheet 12c is shown with both a compartmentalized surface 24c and protrusions 40c, in some examples, the anchor sheet 12c may have protrusions 40c independent of the compartmentalized surface 24c.

Example 4

In some examples, where an adhesive bond is used, the decorative covering 14, 14b, 14c may be used with a temporary covering. The temporary covering disclosed herein may be useful for assisting in attaching a decorative covering on a substrate by allowing for alignment and/or positioning of the decorative covering on the substrate while preventing an adhesive bond from forming between the decorative covering and the substrate while the decorative covering is being moved into the desired position.

The temporary covering may be a temporary layer that is placed between the decorative covering and the substrate at least for a period of time, preventing an adhesive layer from creating an adhesive bond between the decorative covering and the substrate, thus allowing for positioning of the decorative covering. The temporary covering is not receptive to the adhesive layer, thus it is removable, without damage to the decorative covering and/or the substrate, from between the decorative covering and the substrate once the decorative covering is in place.

Figure 24:
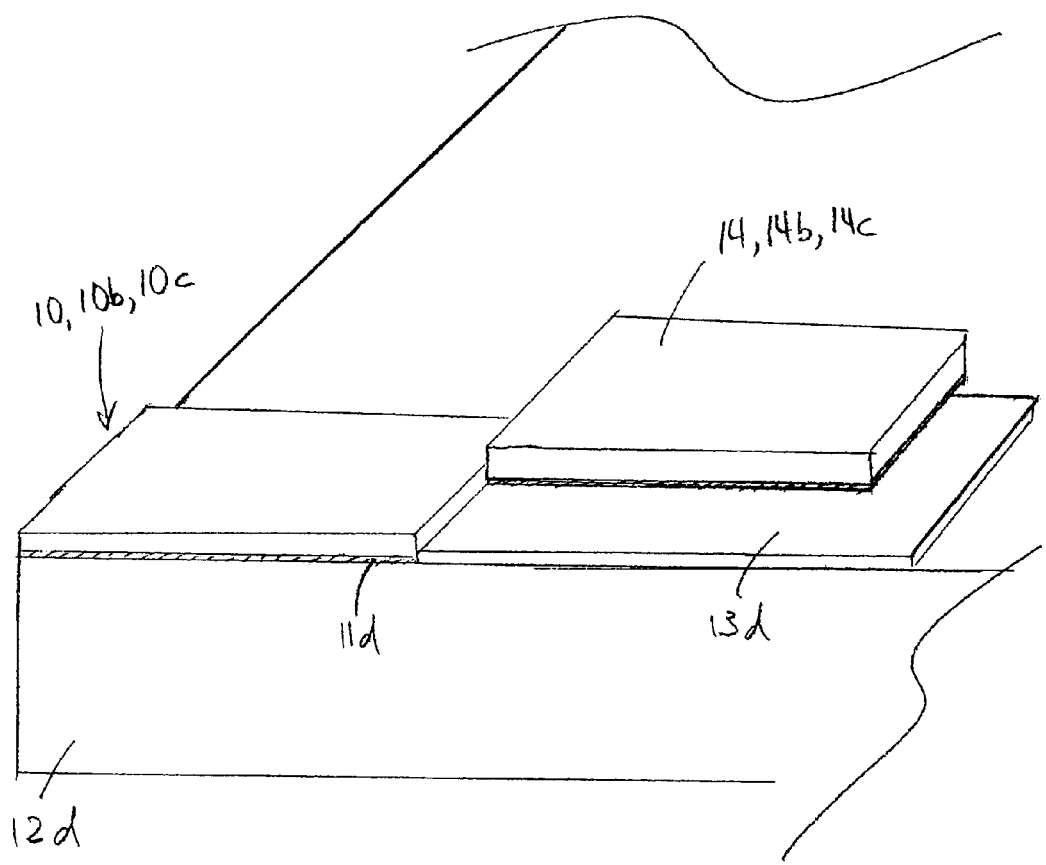
FIG. 24 illustrates an example of the use of a temporary covering for attaching a covering module to a substrate.

FIG. 24 illustrates an example of a temporary covering 13d in use with an example decorative covering 14, 14b, 14c. In this example, the decorative covering 14, 14b, 14c is provided with an adhesive 11d (which may be the same as adhesive 28, 28b, 28c) on a substrate-facing side, for adhering to a substrate 12d. In the example shown, there are two decorative coverings 14, 14b, 14c. The decorative covering 14, 14b, 14c on the left is shown already adhered to the substrate 12d. The decorative covering 14, 14b, 14c on the right is shown in the process of being attached to the substrate 12d, aided by the temporary covering 13d.

In use, the temporary covering 13d may be placed between the decorative covering 14, 14b, 14c and the substrate 12d, preventing or interfering with formation of an adhesive bond between the covering module and the substrate. The decorative covering 14, 14b, 14c may then be moved or aligned into position over the temporary covering 13d. Once the decorative covering 14, 14b, 14c has been moved into the desired position, the temporary covering 13d may be removed (e.g., slipped out from under the decorative covering 14, 14b, 14c) while keeping the decorative covering 14, 14b, 14c in the desired position. Once the temporary covering 13d is removed, an adhesive bond is allowed to form between the decorative covering 14, 14b, 14c and the substrate 12d (e.g., by applying pressure to the decorative covering 14, 14b, 14c or by the weight of the decorative covering 14, 14b, 14c on the substrate 12d).

Depending on the configuration of the decorative covering 14, 14b, 14c and the substrate 12d, the temporary covering 13d may be placed: between the decorative covering 14, 14b, 14c and the adhesive layer 11d (e.g., where the adhesive layer 11d is provided on a covering-receiving side of the substrate 12d); or between the adhesive layer 11d and the substrate 12d (e.g., where the adhesive layer 11d is provided on a substrate-facing side of the decorative covering 14, 14b, 14c).

In some examples, an adhesive bond is not provided directly between the decorative covering 14, 14b, 14c or the substrate 12d, but is formed indirectly via an intermediate layer between the covering module and the substrate. Although referred to in the singular, the intermediate layer may be a single layer or may include multiple layers. Where the intermediate layer comprises multiple layers, one or more of the multiple layers may be attached to each other (e.g., either permanently or detachably attached) in an attached assembly or may be free-floating from each other in a loose assembly.

Figure 25:
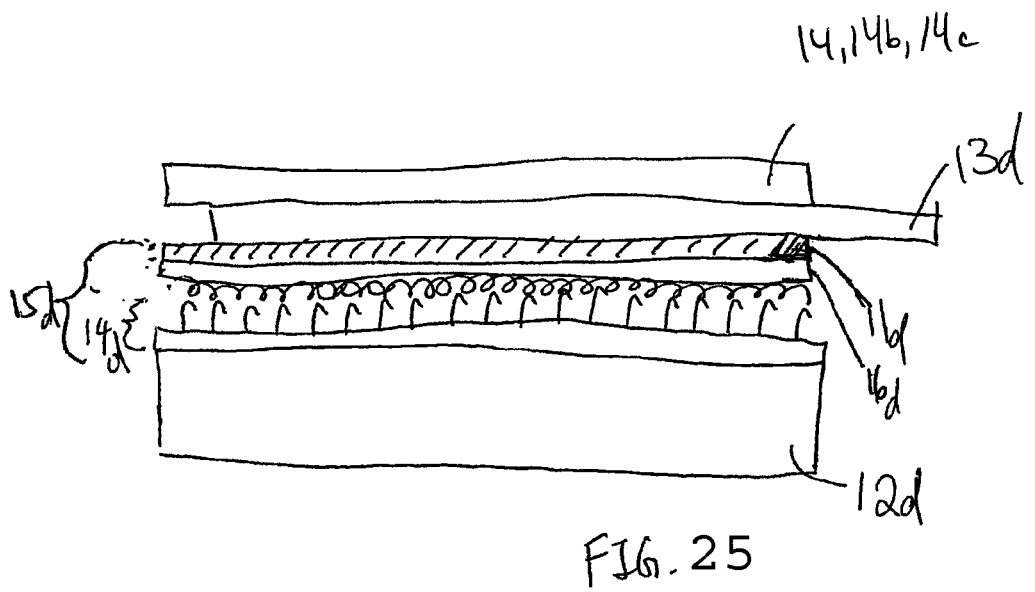
FIG. 25 illustrates another example of the use of a temporary covering for attaching a covering module to a substrate, where there is an intermediate layer.
Figure 26A:
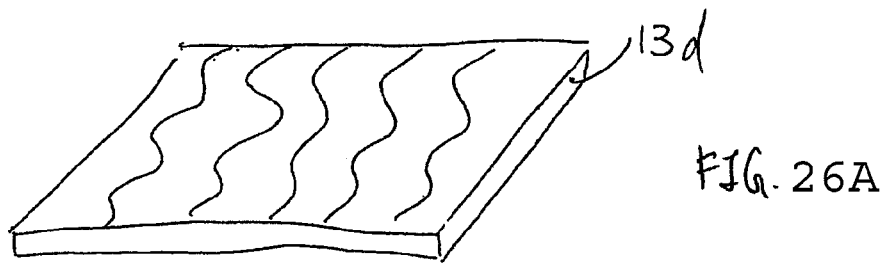
FIGS. 26A-26E illustrate examples of a temporary covering having an interrupted surface.
Figure 26B:
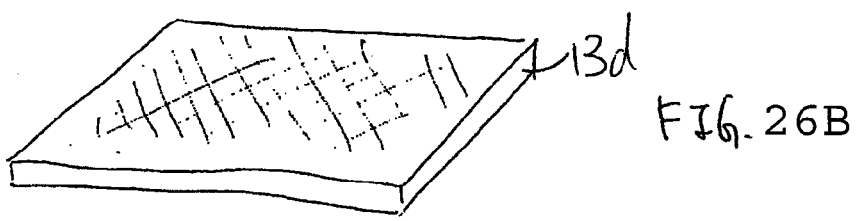
Figure 26C:
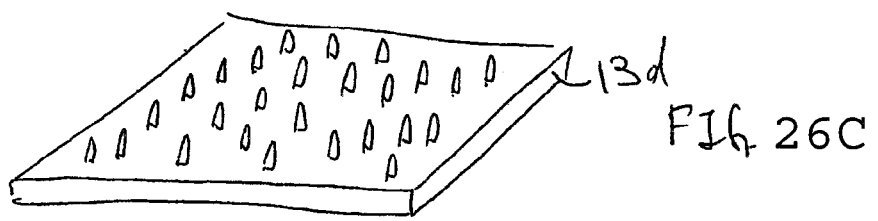
Figure 26D:
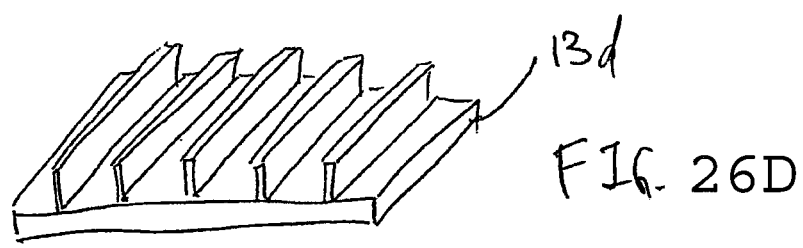
Figure 26E:
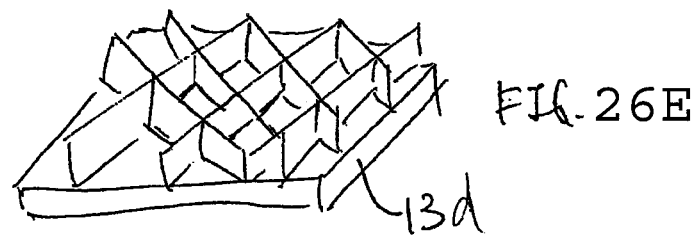
Figure 26F:
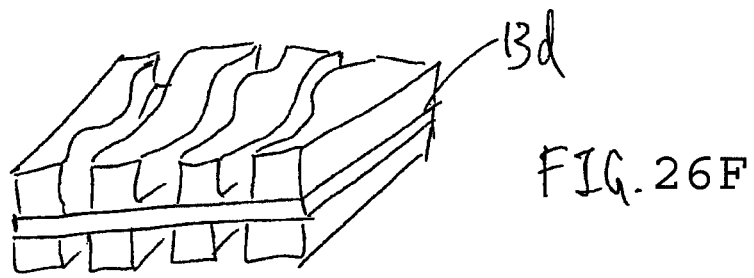
FIGS. 26F-26I illustrate examples of a temporary covering having interrupted surfaces on opposing sides.
Figure 26G:
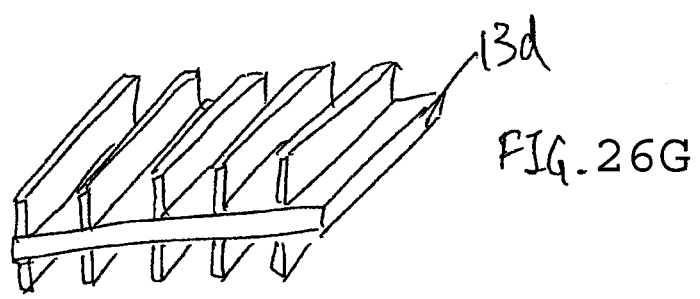
Figure 26H:
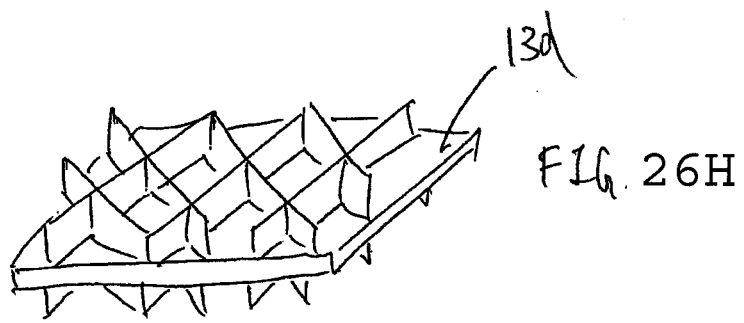
Figure 26I:
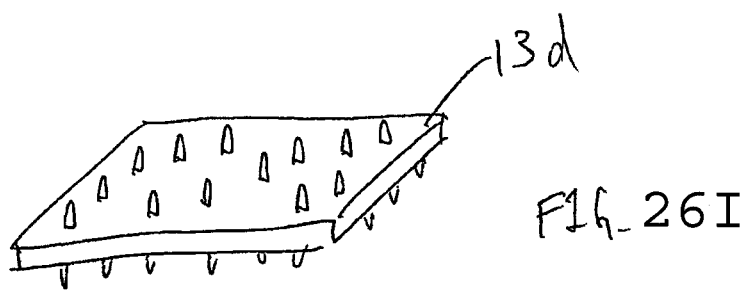

For example, as shown in FIG. 25, an intermediate layer 15d may include an anchor layer 14d (e.g., anchor sheet 12, 12b, 12c), a loop layer 16d and/or the adhesive layer 11d. In some examples, the intermediate layer 15d includes only the anchor layer 14d (i.e., the anchor sheet 12, 12b, 12c). The intermediate layer 15d may be placed directly on the substrate 12d (e.g., a flooring or wall surface such as an unfinished concrete surface, or a previously installed covering). The anchor layer 14d may be free-floating on the substrate 12d (i.e., not attached to the substrate 12d) or may be attached to the substrate 12d (e.g., by way of fasteners such as screws or an adhesive). In the example shown, the adhesive layer 11d is provided on the loop layer 16, which may detachably attach to the anchor layer 14d (e.g., with a hook and loop fastener in the example shown) such that the adhesive layer 11d faces away from the substrate 12d and provides a covering-receiving side. In this example, the intermediate layer 15d is placed on the substrate 12d and the temporary covering 13d is shown placed between the adhesive layer 11d of the intermediate layer 15d and the decorative covering 14, 14b, 14c. In other examples, the intermediate layer 15d may be provided on the decorative covering 14, 14b, 14c and the temporary covering 13d may be placed between the intermediate layer 15d and the substrate 12d.

Thus, although the description generally describes the formation of an adhesive bond between the decorative covering 14, 14b, 14c and the substrate 12d, it should be understood that the adhesive bond may be formed directly between the decorative covering 14, 14b, 14c and the substrate 12d, or indirectly by way of an intermediate layer 15d. The intermediate layer 15d may be an anchor sheet 12, 12b, 12c. For example, where the decorative covering 14, 14b, 14c forms an adhesive bond with the anchor sheet 12, 12b, 12c, the temporary covering 13d may be placed between the decorative covering 14, 14b, 14c and the anchor sheet 12, 12b, 12c to allow positioning of the decorative covering 14, 14b, 14c.

In some examples, the anchor layer 14d may comprise anchor sheets or plates that are placed on the substrate 12d in a free-floating manner. Alternatively, in some examples where the anchor layer 14d comprises hook plates, the anchor layer 14d may then be secured through the use of fasteners such as screws which are drilled through the hook plates to reinforce against heavy rolling stock. The anchor layer 14d may comprise hooks for receiving the adhesive layer 11d (e.g., where the adhesive layer 11d is provided on a loop layer 16d) or a covering. In some examples, the adhesive layer 11d may be a pressure sensitive adhesive (e.g., factory applied) provided on a loop layer (e.g., a loop textile) on a side opposing the loops. The adhesive may be provided with a protective liner to avoid damaging the adhesive prior to use. The loop side is applied against the hook side of the anchor layer 14d, forming a detachable hook and loop attachment. The adhesive layer 11d, loop layer 16d and the anchor layer 14d together may thus form the intermediate layer 15d. The protective liner of may be removed from the adhesive layer 11d, exposing the adhesive. One or more decorative coverings 14, 14b, 14c may then be placed over the intermediate layer 15d, with the use of the temporary covering 13d as described here to assist in positioning of the decorative coverings 14, 14b, 14c.

In some examples, the intermediate layer 15d may include only the anchor layer 14d and the adhesive layer 11d is provided on the decorative covering 14, 14b, 14c. In some examples, the adhesive layer 11d could alternatively or additionally be provided on the anchor layer 14d. Thus, the adhesive bond between the decorative covering 14, 14b, 14c and the substrate 12d may be formed indirectly by way of the anchor layer 14d. In this case, the temporary covering 13d may be placed between the anchor layer 14d and the decorative covering 14, 14b, 14c to allow for positioning of the decorative covering 14, 14b, 14c.

The decorative covering 14, 14b, 14c may be of any suitable size, for example ranging from about 12 inches by 12 inches to about 12 feet by 20 feet. The decorative covering 14, 14b, 14c may be of any geometry or have a random shape.

The adhesive layer 11d may comprise any suitable adhesive, including, for example, pressure sensitive adhesives or liquid adhesives. Where the adhesive layer 11d comprises a liquid adhesive, the liquid adhesive may be allowed to partially dry or set (i.e., to "tackify") before installation of the decorative covering 14, 14b, 14c.

A function of the temporary covering 13d is to prevent pre-mature attachment of a decorative covering 14, 14b, 14c until such time that proper alignment of the covering 14, 14b, 14c (e.g., to an adjacent covering 14, 14b, 14c as shown in FIG. 24) is achieved and thus decreasing the appearance of discontinuity (e.g., as created by the seam line of any two such decorative coverings 14, 14b, 14c).

A feature of the temporary covering 13d is that it is relatively non-receptive to or has decreased compatibility with the adhesive layer 11d to the extent that the temporary covering 13d may be readily removed at such time when the decorative covering 14, 14b, 14c has been placed in the desired position (e.g., adjacent to another module or a wall).

In some examples, the temporary covering 13d may comprise a material that is relatively non-receptive to the adhesive layer 11d. In some examples, the temporary covering 13d may be a film or sheet material of an individual or collective size which roughly corresponds to the size of the covering module. In some examples, the film or sheet of the temporary covering 13d may include materials such as polyethylene, polypropylene, or any other material that is suitably non-receptive or incompatible with the adhesive layer 11d In some examples, certain materials, such as paper, aluminum, or polycarbonate, which on their own may be receptive to the adhesive layer 11d and therefore unsuitable for use as a temporary covering 13d, may be treated with non-receptive or incompatible coatings such as Teflon, silicone, etc. By the addition of these coatings the otherwise unsuitable material may become sufficiently non-receptive to be used for the temporary covering 13d.

In some examples, the temporary covering 13d may have an interrupted surface (e.g., as shown in FIGS. 26A-26E, grooves (FIG. 26A), a rough or textured surface (FIG. 26B), protrusions (FIG. 26C), ridges (FIG. 26D), a waffled surface (FIG. 26E) etc.) to decrease contact with the adhesive layer 11d and thus decrease receptiveness of the temporary covering 13d to the adhesive layer 11d. The interrupted surface may be used in conjunction with the use of a non-receptive material for the temporary covering 13d. Alternatively, the interrupted surface may be used to decrease the receptiveness of an otherwise receptive material for use in the temporary covering 13d.

Figure 28A:
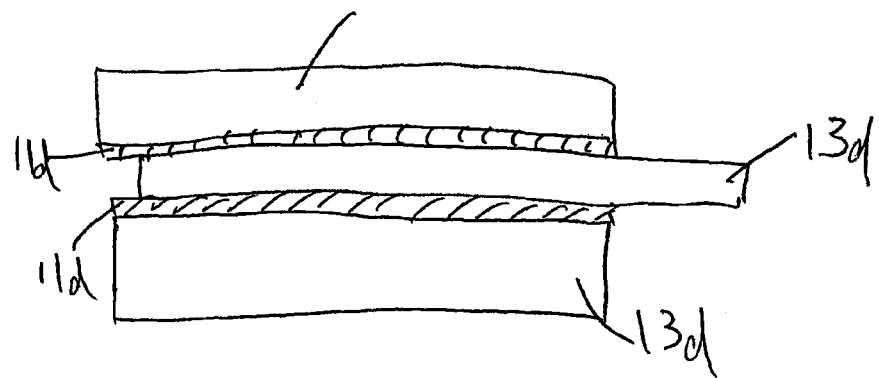
FIGS. 28A and 28B illustrate example uses of a temporary covering for attaching a covering module to a substrate, where there are two adhesive layers.
Figure 28B:
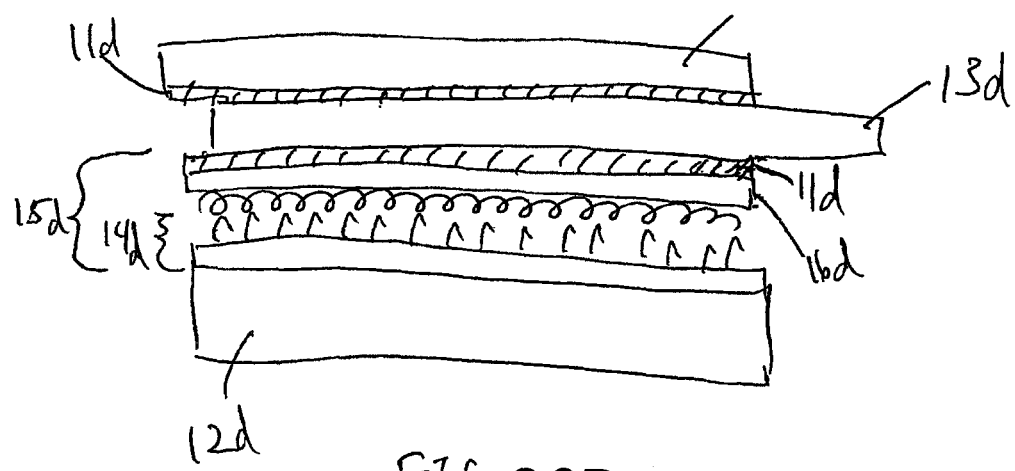

In some examples, the temporary covering 13d may be non-receptive to the adhesive layer 11d on both faces, for example where the temporary covering 13d is to be used between two adhesive layers 11d. Examples may be where there is an adhesive layer 11d on both the substrate 12d and the decorative covering 14, 14b, 14c (as shown in FIG. 28A), or where the temporary covering 13d is to be placed between an intermediate layer 15d bearing the adhesive layer 11d and another adhesive layer 11d provided on the decorative covering 14, 14b, 14c (as shown in FIG. 28B) or the substrate 12d. In such cases, the temporary covering 13d may comprise a non-receptive material or non-receptive coating (e.g., as described above) on both surfaces. The temporary covering 13d may also be provided with an interrupted surface on both sides, for example as shown in FIGS. 26F-26I, where the temporary covering 13d has grooves (FIG. 26F), ridges (FIG. 26G), waffled surfaces (FIG. 26H) or protrusions (FIG. 26I) on both sides. The temporary covering 13d may also have a rough or textured surface on both sides (not shown). In the examples of FIGS. 26A-26I, the interrupted surface may have features smaller than that illustrated. For example, the interrupted surface may appear relatively smooth to touch and/or to the naked eye.

The intermediate layer 15d may be the anchor sheet 12, 12b, 12c and the temporary covering 13d may be used between the anchor sheet 12, 12b, 12c and the decorative covering 14, 14b, 14c.

In some examples, the temporary covering 13d may be similar or identical to the anchor sheet 12b, 12c and may have an interrupted surface 24b and/or a compartmentalized surface 24c similar to the anchor sheet 12b, 12c.

In some examples (not shown), the temporary covering 13d may comprise a woven sheet or film, or other suitable textile material. The woven sheet or film may provide a textured or rough surface for the temporary covering 13d. Alternatively or in addition, the woven sheet or film may provide apertures or openings through the thickness of the temporary covering 13d. Such openings may be sufficiently small to prevent the formation of an adhesive bond between the decorative covering 14, 14b, 14c and the substrate 12d while the temporary covering 13d is placed between the two.

In some examples, the thickness of the temporary covering 13d may be in the range of about 0.008" to about 0.080". In some examples, the temporary covering 13d may be approximately the same size as the decorative covering 14, 14b, 14c, although in some examples the temporary covering 13d may be larger than the decorative covering 14, 14b, 14c to facilitate removal of the temporary covering 13d from between the decorative covering 14, 14b, 14c and the substrate 12d.

Figure 27:
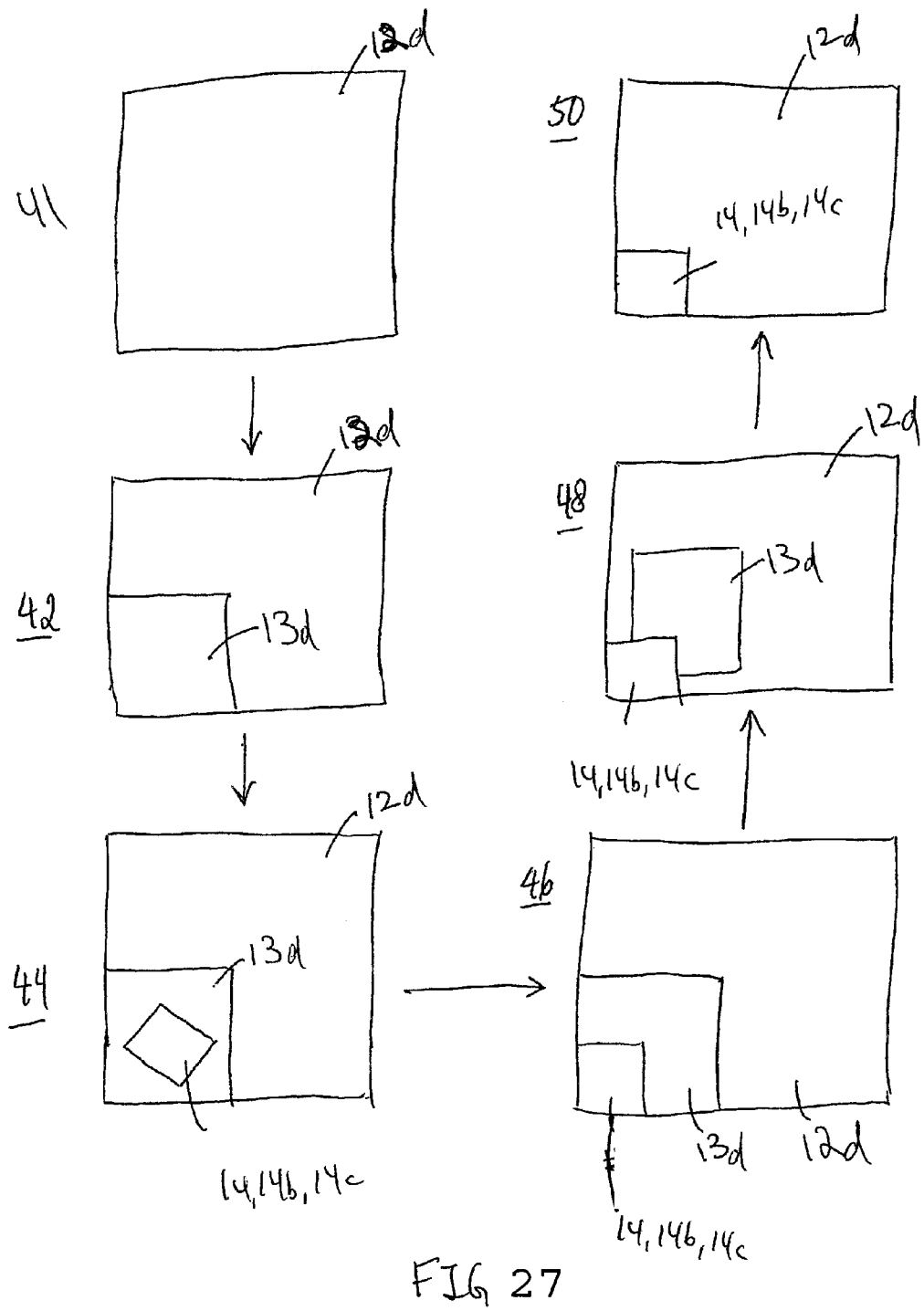
FIG. 27 illustrates an example method of attaching a covering module to a substrate using a temporary covering.

FIG. 27 illustrates an example method of attaching a decorative covering 14, 14b, 14c to a substrate 12d using a temporary covering 13d. In this example, the adhesive layer 11d is not shown for simplicity, however the adhesive layer 11d may be provided on the decorative covering 14, 14b, 14c, the substrate 12d or on an intermediate layer 15d as described above.

The substrate 12d is shown at 41. Although the substrate 12d is shown bare, the substrate 12d may also already have one or more decorative coverings 14, 14b, 14c already attached.

At 42, the temporary covering 13d is placed on the substrate.

At 44, the decorative covering 14, 14b, 14c is placed on the temporary covering 13d. Thus, the temporary covering 13 is provided between the decorative covering 14, 14b, 14c and the substrate 12, preventing the formation of an adhesive bond between the decorative covering 14, 14b, 14c and the substrate 12.

At 46, the decorative covering 14, 14b, 14c is moved into a desired position.

At 48, the temporary covering 13d is removed from between the decorative covering 14, 14b, 14c and the substrate 12d, allowing the formation of an adhesive bond between the decorative covering 14, 14b, 14c and the substrate 12d. Here, the temporary covering 13d is shown partially removed.

At 50, the temporary covering 13d is fully removed and the decorative covering 14, 14b, 14c is fully attached to the substrate 12d in the desired position by way of an adhesive bond.

Some of the embodiments described herein may permit the adhesion of a decorative covering 14, 14b, 14c to a pre-determined manufactured surface. This arrangement may help eliminate or reduce difficulties associated with installation onto existing surfaces, such as concrete, which may detrimentally permit moisture to affect the adhesion and/or the decorative covering 14, 14b, 14c itself. Although the above example describes the positioning of a decorative covering 14, 14b, 14c over a substrate 12d, it should be understood that in some examples, the temporary covering 13d may be used to assist in positioning of a decorative covering 14, 14b, 14c over an anchor sheet 12, 12b, 12c.

In some examples, the temporary covering 13d may be used to assist in positioning other components of the covering module 10, 10b, 10c. For example, the temporary covering 13d may be useful for positioning the anchor sheet 12, 12b, 12c on the surface or substrate 12d where the anchor sheet 12, 12b, 12c is attached to the surface with an adhesive bond.

In general, the decorative covering 14, 14b, 14c and the anchor sheet 12, 12b, 12c may be of a four sided shape such as square or rectangular. Accordingly, a joining region 34, 34b, 34c may be provided on two adjacent sides of the covering module 10, 10b, 10c, 10d and a joining region 36, 36b, 36c may be provided on the other two adjacent sides of the covering module 10, 10b, 10c, 10d. Alternatively, a joining region 34, 34b, 34c may be provided on one peripheral side of the covering module 10, 10b, 10c, 10d and a joining region 36, 36b, 36c may be provided on a different peripheral side of the covering module 10, 10b, 10c, 10d. In a further embodiment, a portion of joining region 34, 34b, 34c and a portion of joining region 36, 36b, 36c could be disposed on a same peripheral side of the covering module 10, 10b, 10c, 10d. In some example embodiments, the covering module 10, 10b, 10c, 10d has only the joining region 34, 34b, 34c or only the joining region 36, 36b, 36c, and is designed to be attached to an adjacent covering module 10, 10b, 10c, 10d having the complementary respective joining region 36, 36b, 36c or joining region 34, 34b, 34c.

Figure 12C:
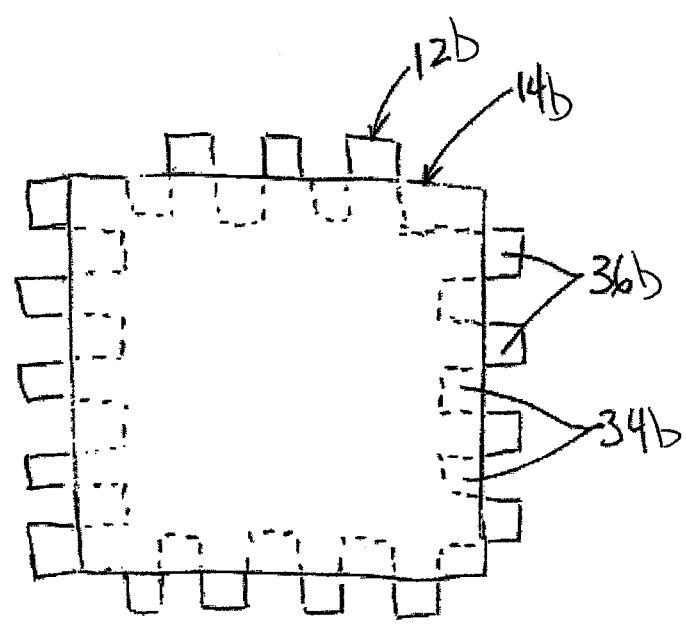
FIG. 12C illustrates a top plan view of the covering module in accordance with another example embodiment.

The decorative covering 14, 14b, 14c and the anchor sheet 12, 12b, 12c may also be of other geometric shapes having more or less than four sides so long as neighboring covering modules 10, 10b, 10c, 10d may be fitted together in an interlocking manner (or in a "jigsaw" type manner). In a further example embodiment, a portion of joining region 34b and a portion of joining region 36b could be disposed on a same side of the covering module 10b, for example as illustrated by FIG. 12C. In the example shown, each side of the covering module has portions of the joining region 34b as well as portions of the joining region 36b, in an interlocking configuration.

The covering module 10, 10b, 10c may be attached to an adjacent module 10, 10b, 10c using a detachable bond (e.g., detachable adhesive bond, hook and loop joining system or other detachable mechanical joining system) or a permanent bond (e.g., permanent adhesive bond or permanent mechanical joining system) at the joining regions 34, 34b, 34c, 36, 36b, 36c.

The anchor sheet 12, 12b, 12c and/or the decorative covering 14, 14b, 14c may be made of any suitable material, rigid or flexible. In some examples, the anchor sheet 12, 12b, 12c and/or the decorative covering 14, 14b, 14c may be made of a rollable material, such as vinyl. Suitable rigid or flexible materials for the decorative covering 14, 14b, 14c may include, for example, vinyl, luxury vinyl, linoleum, carpet, parquet, tile, wood ceramics, vinyl composition tile (VCT), stone, luxury vinyl tile (LVT), rubber, or any other suitable covering material. The anchor sheet 12, 12b, 12c may be made of similar materials.

In some examples, the covering module 10, 10b, 10c may be installed in a one-step fashion or in a two-step fashion. In the one-step fashion, the covering module 10, 10b, 10c is provided with the decorative covering 14, 14b, 14c and the anchor sheet 12, 12b, 12c already attached (e.g., detachably pre-attached or permanently attached) and is installed on the surface in one piece. Subsequent adjacent covering modules 10, 10b, 10c may be similarly installed in one piece, with overlapping joining regions. In the two-step fashion, the anchor sheet 12, 12b, 12c is first installed on the surface and the separately provided decorative covering 14, 14b, 14c is secondly applied over the anchor sheet 12, 12b, 12c.

In some examples, the decorative covering 14, 14b, 14c and the anchor sheet 12, 12b, 12c may be of same or similar dimensions, which may allow the installation of anchor sheets 12, 12b, 12c and decorative coverings 14, 14b, 14c in a tiled manner. This may be useful, for example, where the decorative covering 14, 14b, 14c is pre-attached, permanently attached or integral to the anchor sheet 12, 12b, 12c. In such an example, covering modules 10, 10b, 10c may be installed by placing them down in a one-step fashion, with overlapped joining regions.

Alternatively, anchor sheets 12, 12b, 12c may be first placed on the surface (e.g., in a tiled fashion) and decorative coverings 14, 14b, 14c may then be placed in a tiled fashion over the anchor sheets 12, 12b, 12c, in a two-step fashion.

In some examples, the anchor sheet 12, 12b, 12c and the decorative covering 14, 14b, 14c may have substantially different dimensions. For example, the anchor sheet 12, 12b, 12c may be provided as tiles (e.g., 12"×12" in size) and the decorative covering 14, 14b, 14c may be provided in a much larger size (e.g., a 6' wide roll). The anchor sheets 12, 12b, 12c may be placed on the surface in a tiled fashion and the decorative covering 14, 14b, 14c may be unrolled over the anchor sheets 12, 12b, 12c. Alternatively, the decorative covering 14, 14b, 14c may be provided as tiles (e.g., 12"×12" in size) and the anchor sheet 12, 12b, 12c may be provided in a much larger size (e.g., a 6' wide roll). The anchor sheet 12, 12b, 12c may be unrolled over the surface and the decorative coverings 14, 14b, 14c may be placed over the anchor sheet 12, 12b, 12c in a tiled fashion. Alternatively, both the anchor sheet 12, 12b, 12c and the decorative covering 14, 14b, 14c may be provided as a roll. Other such combination of sizes may be possible. This may be useful where a roll-suitable material is used for the decorative covering 14, 14b, 14c and/or the anchor sheet 12, 12b, 12c.

The anchor sheet 12, 12b, 12c may be attached to the underlying subsurface, such as a floor or wall, or it may be free-floating on a floor within the boundaries of a room or even on its own where one or more anchor sheets 12, 12b, 12c and one or more decorative coverings 14, 14b, 14c together have sufficient mass and rigidity, or, are installed to prevent movement. The anchor sheet 12, 12b, 12c and decorative covering 14, 14b, 14c should in combination have sufficient rigidity to support the decorative covering 14, 14b, 14c from horizontal shear force applied to the covering modules 10, 10b, 10c when the covering modules 10, 10b, 10c are laid onto a rigid supporting subsurface. In some cases, the anchor sheet 12, 12b, 12c may be attached to the underlying subsurface, at a number of discrete points, for example where the covering module 10, 10b, 10c is used on a wall, a floor or other such surface.

In some examples, the anchor sheet 12, 12b, 12c may be attached to the underlying surface either detachably (e.g., with screws) or permanently (e.g., with an adhesive). Where the anchor sheet 12, 12b, 12c is permanently attached to the surface, such an attachment may be useful for reducing unwanted echoing or noise when a load (e.g., a person's footsteps) is placed over the covering module 10, 10b, 10c. Although the anchor sheet 12, 12b, 12c may be permanently attached to the surface, the decorative covering 14, 14b, 14c may still be detachably attached to the anchor sheet 12, 12b, 12c, thus allowing for the ability to change the decorative covering 14, 14b, 14c without having to remove the entire covering module 10, 10b, 10c including the anchor sheet 12, 12b, 12c.

The anchor sheets 12, 12b, 12c may substantially cover the entire underlying subsurface under which the decorative covering 14, 14b, 14c are installed. The anchor sheet 12, 12b, 12c may be fabricated from a material that has a suitable resistance to moisture. For example, the anchor sheet 12, 12b, 12c may be fabricated from an aluminum-based material, a thermoplastic polymer such as polypropylene or other suitable materials. With a thermoplastic polymer, the anchor sheet 12, 12b, 12c could be fabricated using an injection molding process. The anchor sheet 12, 12b, 12c should have a configuration and thickness so as to provide sufficient rigidity. Depending on the material selected for the anchor sheet 12, 12b, 12c, the anchor sheet 12, 12b, 12c may have a thickness of around 1 mm (0.04 inch) to around 2.4 mm (3/32 inch) or more. However, the anchor sheet 12, 12b, 12c should also maintain a certain level of flexibility to enable the anchor sheet to "ride" over small imperfections and yet conform to the underlying subsurface.

In order to facilitate installation, the covering module 10, 10b, 10c may be provided in a ready-to-install configuration where the anchor sheet 12, 12b, 12c and the decorative covering 14, 14b, 14c are pre-attached together. As described above, the anchor sheet 12, 12b, 12c and the decorative covering 14, 14b, 14c may alternatively be integral to each other or provided permanently attached to each other. The covering module 10, 10b, 10c may also be provided with a protective cover 40 (for example as shown in FIGS. 4A and 4B) over the adhesive 28, 28b, 28c so as to reduce the likelihood that the adhesive 28, 28b, 28c becomes contaminated during shipping and prior to installation, for example.

While the decorative covering 14, 14b, 14c may be a relatively flexible material, it is understood that the decorative covering 14, 14b, 14c may also comprise a relatively rigid material. In a flooring application for example, the decorative covering 14, 14b, 14c could comprise a floor covering including vinyl, luxury vinyl, linoleum, carpet, parquet, tile, wood ceramics, vinyl composition tile (VCT) or any other suitable flexible or rigid flooring surfaces. For some materials, such as VCT, the covering module 10, 10b, 10c may be more susceptible to seepage of liquids between adjacent covering modules 10, 10b, 10c, and the separate voids provided in the compartmentalized surface 24c and/or the spacing in the interrupted surface 24b may be useful to contain such seepage, as described above.

Where the decorative covering 14, 14b, 14c is detachable from the anchor sheet 12, 12b, 12c, the replacement of the decorative covering 14, 14b, 14c from the anchor sheet 12, 12b, 12c may be more easily performed and may require less effort when the decorative covering 14, 14b, 14c is relatively flexible. For example, a flexible decorative covering such as vinyl may be progressively peeled from the anchor sheet 12,

12*b*, 12*c* and require less force in comparison with a rigid material that would have to be pulled away from the anchor sheet 12, 12*b*, 12*c*. Where the decorative covering 14, 14*b*, 14*c* includes loops 26 for a hook and loop joining system, the loops 26 may be secured to the back face 22, 22*b*, 22*c* of the decorative covering 14, 14*b*, 14*c* using a suitable glue or securing methods known in the art.

Where an adhesive bond is used to join adjacent modules 10, 10*b*, 10*c* and/or to join the decorative covering 14, 14*b*, 14*c* and the anchor sheet 12, 12*b*, 12*c*, the contact surface 26*b*, 26*c* (whether provided on the decorative covering 14, 14*b*, 14*c*, the anchor sheet 12, 12*b*, 12*c* or both) may have properties allowing it to be released from the adhesive bond and reused. Similarly, the adhesive 28, 28*b*, 28*c* may have properties allowing it to be released from the hooks 24, interrupted surface 24*b*, and/or compartmentalized surface 24*c*, such that the adhesive 28, 28*b*, 28*c* remains on the contact surface 26*b*, 26*c* when the adhesive bond is released. The adhesive 28, 28*b*, 28*c* may be a pressure-sensitive adhesive.

In an example embodiment, the adhesive 28, 28*b*, 28*c* is applied uniformly and continuously over the area of the back face 22, 22*b*, 22*c* of the decorative covering 14, 14*b*, 14*c*. In other example embodiments, the adhesive 28, 28*b*, 28*c* may be provided in an intermittent or interrupted manner, for example in order to match the protruding portions of the interrupted surface 24*b* or the non-recessed portions of the compartmentalized surface 24*c*. In an example embodiment, the contact surface 26*b*, 26*c* is substantially smooth and covers the entire area of the back face 22, 22*b*, 22*c* of the decorative covering 14, 14*b*, 14*c*. In some examples, the contact surface 26*b*, 26*c* is uneven. In some example embodiments, the contact surface 26*b*, 26*c* may be provided only on portions of the back face 22, 22*b*, 22*c* of the decorative covering 14, 14*b*, 14*c*, such as where the decorative covering 14, 14*b*, 14*c* is designed to form an adhesive bond only at portions of its back face 22, 22*b*, 22*c*. For example, the decorative covering 14, 14*b*, 14*c* c may be designed to accommodate both adhesive-based joining systems and hook and loop joining systems, such that portions of its back face 22, 22*b*, 22*c* has the contact surface 26*b*, 26*c* for forming an adhesive bond and other portions of its back face 22, 22*b*, 22*c* has loops 26 for a hook and loop joining system.

The hooks 24, interrupted surface 24*b* or compartmentalized surface 24*c* and the respective loops 26, or contact surface 26*b*, 26*c*, in some example embodiments, are provided separately on the covering-receiving face 16, 16*b*, 16*c* of the anchor sheet 12, 12*b*, 12*c* and the back face 22, 22*b*, 22*c* of the decorative covering 14, 14*b*, 14*c* respectively, or vice versa.

Where used, the adhesive 28, 28*b*, 28*c* may be provided in any suitable manner. In some example embodiments, the adhesive 28, 28*b*, 28*c*, such as a pressure sensitive adhesive, is provided on the contact surface 26*b*, 26*c*. For example, the adhesive 28, 28*b*, 28*c* may be provided in the form of a suitable double-sided adhesive tape applied to the contact surface 26*b*, 26*c* or may be an adhesive that is applied in liquid form. In another example embodiment, the adhesive 28, 28*b*, 28*c* may comprise two complementary components where a first component is applied to the contact surface 26*b*, 26*c* and a second component is applied to the interrupted surface 24*b* or the compartmentalized surface 24*c*. In another example embodiment, the adhesive 28, 28*b*, 28*c* may be applied only to the interrupted surface 24*b* or the compartmentalized surface 24*c*, so that the contact surface 26*b*, 26*c* is provided with no adhesive.

The adhesive 28, 28*b*, 28*c* may be selected so that it provides a sufficient bond and shear strength between the decorative covering 14, 14*b*, 14*c* and the anchor sheet 12, 12*b*, 12*c*. Advantageously, the adhesive 28, 28*b*, 28*c* could also be selected so that it is reusable a number of times and that the decorative covering 14, 14*b*, 14*c* can be detached from the anchor sheet 12, 12*b*, 12*c* and replaced with a new decorative covering 14, 14*b*, 14*c* even after a long time duration, such as several years, after the initial installation. The adhesive 28, 28*b*, 28*c* may also be selected to have a resistance or impermeability to moisture.

Although protrusions 40*c* on the surface-contacting side of the anchor sheet 12*c* has been described with reference to one example embodiment of the anchor sheet 12*c*, it should be understood that protrusions 40*c* may be provided on the surface-contact side of any embodiment of the anchor sheet 12, 12*b*, 12*c*. The protrusions 40*c* may be configured (e.g., having a certain density, thickness, height and/or material) to support any expected weight over the anchor sheet 12, 12*b*, 12*c* and to avoid crushing of the protrusions 40*c*.

Similarly any protrusions on the covering-receiving side of the anchor sheet 12, 12*b*, 12*c*, including hooks 24, protrusions of the interrupted surface 24*b*, and non-recessed portions of the compartmentalized surface 24*c*, may be configured (e.g., having a certain density, thickness, height and/or material) to support any expected weight over the anchor sheet 12, 12*b*, 12*c* and to avoid crushing.

In some examples, any protrusions on the covering-receiving side of the anchor sheet 12, 12*b*, 12*c* (e.g., hooks 24, protrusions of the interrupted surface 24*b*, or non-recessed portions of the compartmentalized surface 24*c*) may be suitable both for forming an adhesive bond and for forming a mechanical bond (e.g., using a hook and loop joining system, a hook and hook joining system, or an interlocking joining system) with the decorative covering 14, 14*b*, 14*c*. Similarly, any protrusions on the anchor sheet-contacting side of the decorative covering 14, 14*b*, 14*c* may be suitable both for forming an adhesive bond and for forming a mechanical bond with the anchor sheet 12, 12*b*, 12*c*. For example, the protrusions may be hook- or mushroom-shaped, which would be suitable for forming an adhesive bond as well as for forming a hook and loop or hook and hook bond. The versatility of either forming an adhesive bond or a mechanical bond may allow for adaptability of the covering module 10, 10*b*, 10*c*. For example, while a mechanical bond may be more easily separable, an adhesive bond may provide greater support and prevent dimpling when a load is applied to the decorative covering 14, 14*b*, 14*c*. This versatility may also allow the anchor sheet 12, 12*b*, 12*c* to be used with a large variety of decorative coverings 14, 14*b*, 14*c* having different joining components.

In some examples, a hook and hook joining system may provide for a stronger bond than a hook and loop joining system. A stronger bond may be useful where the covering module 10, 10*b*, 10*c* is applied to a wall or ceiling substrate, or is otherwise expected to support a handing load.

In some examples, recessions or apertures in the anchor sheet 12, 12*b*, 12*c* (e.g., as in the case of a compartmentalized surface 24*c*) may be suitable as the female component of a male/female or interlocking mechanical bond. In such embodiments, the decorative covering 14, 14*b*, 14*c* may be provided with the matching male component on the anchor sheet-contacting side. Similarly, protrusions in the anchor sheet 12, 12*b*, 12*c* (e.g., as in the case of an interrupted surface 24*b*) may be suitable as the male component of a male/female or interlocking mechanical bond. In such embodiments, the decorative covering 14, 14*b*, 14*c* may be provided with the matching female component on the anchor-sheet contacting side. For example, the anchor sheet 12, 12b, 12c and the decorative covering 14, 14b, 14c may be joined together with a "Lego"-like attachment.

Figure 10:
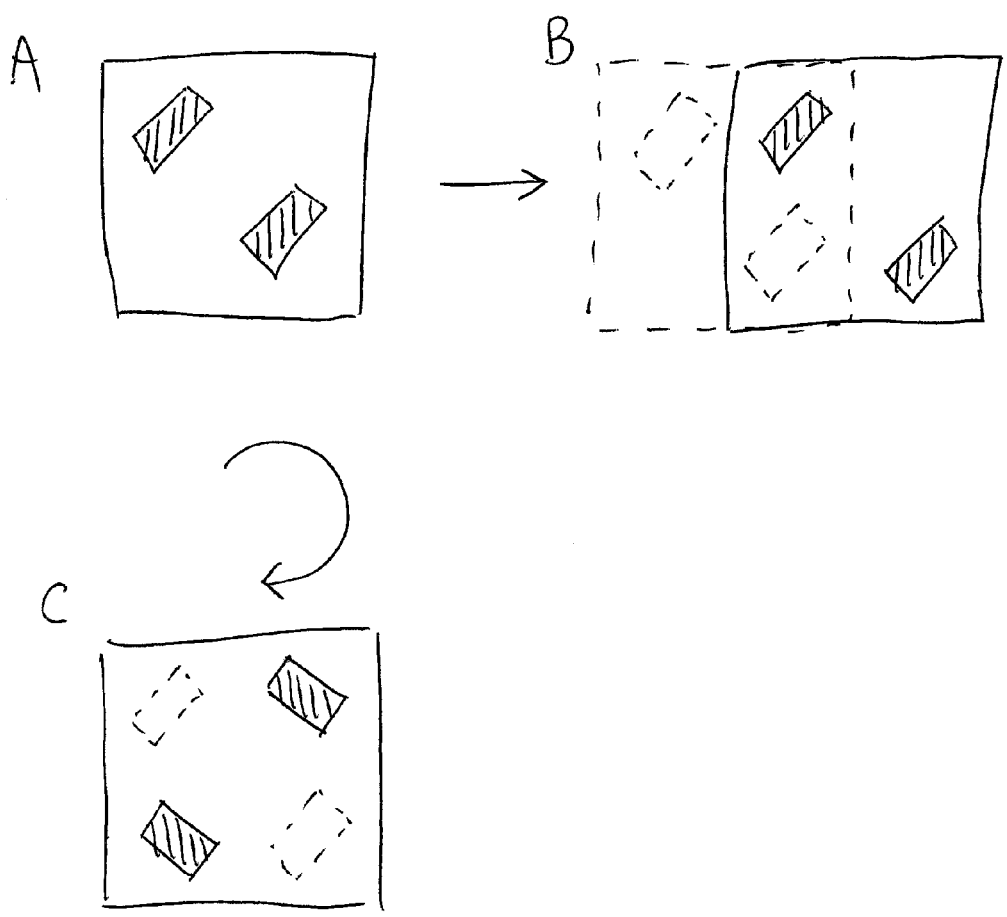
FIG. 10 illustrates asymmetrical rotation and translation of an anchor sheet of the covering module of FIG. 7.

Reference is now made to FIG. 10. The presence of protrusions (e.g., in the interrupted surface 24b) and/or voids (e.g., in the compartmentalized surface 24c) may allow reuse of the adhesive 28, 28b, 28c. Consider a "contact footprint" being defined as the collective regions where the interrupted surface 24b or compartmentalized surface 24c contacts the adhesive 28, 28b, 28c and forms adhesive bonds, as shown by the shaded portions. In some examples, there are regions of the adhesive 28, 28b, 28c that are outside of this contact footprint, as shown by the portions that are not shaded. In such cases, for example where the contact footprint lacks translational and/or rotational symmetry (e.g., the interrupted surface 24b or the compartmentalized surface 24c is not laterally, longitudinally and/or rotationally symmetrical), then the contact surface 26b, 26c may be uncoupled from the interrupted surface 24b or the compartmentalized surface 24c and reused without any weakening of the adhesive bond by reengaging the interrupted surface 24b or the compartmentalized surface 24c at a position slightly shifted or rotated from the original position, such that portions of the adhesive 28, 28b, 28c previously outside of the contact footprint are now used to form the adhesive bond.

For example, if the contact surface 26b, 26c is translated from position A to position B, new portions of the adhesive 28, 28b, 28c now are contacted by the contact footprint (former contact shown in dotted line). Similarly, if the contact surface 26b, 28c is rotated from position A to position C, new portions of the adhesive 28, 28b, 28c now are contacted by the contact footprint (former contact shown in dotted line). Combinations of translation and/or rotation may be used to engage new portions of the adhesive 28, 28b, 28c.

The spacer 32, 32b, 32c may facilitate an adhesive bond, such as a uniform or continuous adhesive bond, near or at the peripheral edge 38, 38b, 38c of the decorative covering 14, 14b, 14c, which may be useful in reducing the likelihood of mold forming under the decorative covering 14, 14b, 14c by inhibiting moisture from seeping under the decorative covering 14, 14b, 14c, for example in the event of a spill. The spacer 32, 32b, 32c may also reduce or eliminate the occurrence of curling or lifting of the corners of the decorative covering 14, 14b, 14c. In a flooring application, this may allow the covering module 10, 10b, 10c to sustain heavier loads and may also allow the covering module 10, 10b, 10c to have an increased resistance to rolling loads.

Figure 11C:
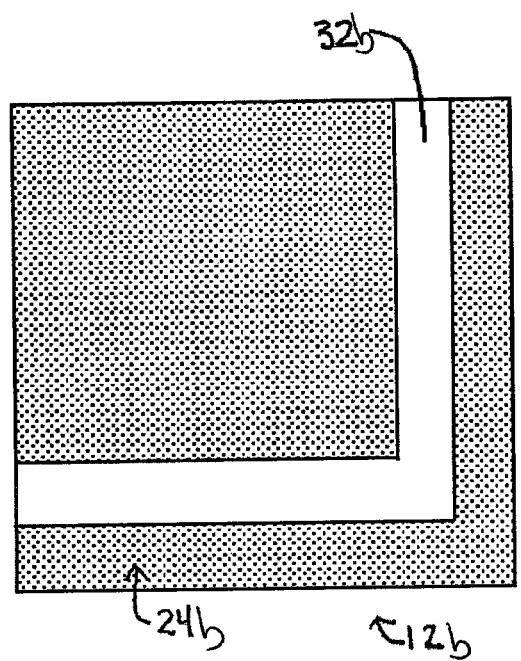
FIG. 11C illustrates a top plan view of an anchor sheet suitable for the covering module of FIG. 11B.
Figure 11D:
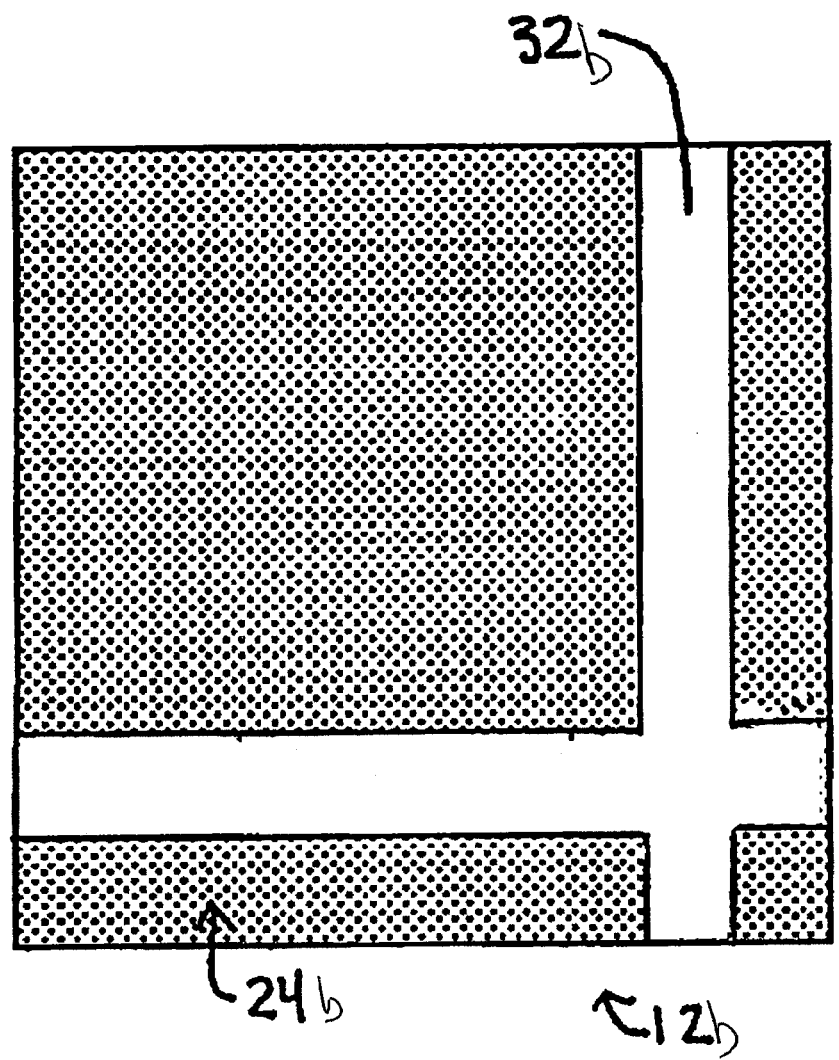
FIG. 11D illustrates a top plan view of an alternative anchor sheet suitable for the covering module of FIG. 11B.

Reference is now made to FIGS. 11C and 11D. FIG. 11C illustrates an anchor sheet 12, 12b, 12c having a spacer 32, 32b, 32c. In this example, the spacer 32, 32b, 32c is attached or integral to the anchor sheet 12, 12b, 12c, in an "L"-shaped configuration designed to match at least portions of two peripheral edges 38, 38b, 38c of the decorative covering 14, 14b, 14c. The spacer 32, 32b, 32c has a height substantially the same as the hooks 24, the one or more protrusions of the interrupted surface 24b or the non-recessed portions of the compartmentalized surface 24c, for example in the range of about 0.01 mm to about 1 cm, or the range of about 0.025 mm to about 1 mm. The spacer 32, 32b, 32c may have any suitable width, for example in the range of about 0.1 mm to about 5 cm, or the range of about 0.2 mm to about 1 cm. The spacer 32b may have a generally uniform width.

FIG. 11D illustrates an alternative anchor sheet configuration having an uninterrupted surface 32, 32b, 32c. The example configuration is intended to provide an overlap area for substantially all edges of a decorative covering. Alternative configurations of surface 32, 32b, 32c may be employed depending upon the boundaries of the surface covering and the extent to which a seal is desirable. The larger surface 32, 32b, 32c is, may lead to an improvement in impermeability, but may increase the retention of the decorative covering 14, 14b, 14c by the anchor sheet 12, 12b, 12c.

While the foregoing disclosure have described certain examples and embodiments in some detail for purposes of clarity and understanding, it will be appreciated by one skilled in the art, that numerous modifications, variations, and adaptations may be made to the particular example embodiments described above without departing from the scope of the present disclosure. In particular, selected features from one or more of the above-described embodiments may be combined to create alternative embodiments not explicitly described. All values and sub-ranges within disclosed ranges are also disclosed. Ranges are provided for the purpose of illustration only, and may be varied depending on suitability and application. The subject matter described herein intends to cover and embrace all suitable changes in technology. All references mentioned are hereby incorporated by reference in their entirety.

What is claimed is:

1. A covering module for installation on a subsurface and for attachment to additional modules to form a finished decorative surface, the covering module comprising:
    a decorative covering having a back face; and
    an anchor sheet having a top face, the back face of the decorative covering being attached to the top face of the anchor sheet; a portion of the decorative covering extending beyond a periphery of the anchor sheet so as to expose a joining region of the back face of the decorative covering; a portion of the anchor sheet extending beyond a periphery of the decorative covering so as to expose a joining region of the top face of the anchor sheet; the joining region of the decorative covering and the joining region of the anchor sheet each comprising a complementary portion of a first joining system of a first type and a second joining system of a second type;
    wherein the first joining system of the decorative covering is connectible to the second joining system of the anchor sheet; and
    wherein the first joining system is a hook and loop joining system and the second joining system is an adhesive joining system, and the adhesive joining system attaches to hooks of the hook and loop joining system.

2. The covering module of claim 1 wherein the adhesive joining system comprises a pressure-sensitive adhesive disposed between the top face of the anchor sheet for connection to a complementary area that is free of loops on the back face of the decorative covering.

3. The covering module of claim 1 wherein the decorative covering is integral with the anchor sheet.

* * * * *